US012801173B2

(12) United States Patent
Okpara

(10) Patent No.: US 12,801,173 B2
(45) Date of Patent: Nov. 17, 2026

(54) METHODS AND APPARATUS TO REGULATE DROPOUT IN VOLTAGE REGULATOR CIRCUITRY

(71) Applicant: Texas Instruments Incorporated, Dallas, TX (US)

(72) Inventor: Chizim Okpara, Tucson, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 120 days.

(21) Appl. No.: 18/753,814

(22) Filed: Jun. 25, 2024

(65) Prior Publication Data

US 2025/0085734 A1 Mar. 13, 2025

Related U.S. Application Data

(60) Provisional application No. 63/537,908, filed on Sep. 12, 2023.

(51) Int. Cl.
*G05F 1/575* (2006.01)
*G05F 1/46* (2006.01)
*G05F 3/26* (2006.01)

(52) U.S. Cl.
CPC .............. *G05F 1/575* (2013.01); *G05F 1/468* (2013.01); *G05F 3/262* (2013.01)

(58) Field of Classification Search
CPC ..... G05F 3/02; G05F 3/30; G05F 3/22; G05F 3/222; G05F 3/242; G05F 3/225; G05F 3/245; G05F 3/20; G05F 3/00; G05F 3/08; G05F 3/10; G05F 3/16; G05F 3/18; G05F 3/185; G05F 3/227; G05F 3/247; G05F 3/26; G05F 3/265; G05F 3/24; G05F 3/262; G05F 1/10; G05F 1/46; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595607; G05F 1/61; G05F 1/613; G05F 1/614; G05F 1/618; G05F 1/62; G05F 1/66; G05F 1/26; G05F 1/561; G05F 1/567; G05F 1/569; G05F 1/571; G05F 1/573; G05F 1/5735; G05F 1/08; G05F 1/153; G05F 1/16; G05F 1/34
See application file for complete search history.

(56) References Cited

U.S. PATENT DOCUMENTS

2021/0311513 A1* 10/2021 Joshi ...................... G05F 1/575
2023/0168703 A1 6/2023 Okpara

* cited by examiner

*Primary Examiner* — Bryan R Perez
(74) *Attorney, Agent, or Firm* — Charles F. Koch

(57) ABSTRACT

An example apparatus includes: voltage source circuitry having a terminal; a first transistor having a first terminal and a control terminal, the control terminal of the first transistor coupled to the terminal of the voltage source circuitry; current mirror circuitry having a first terminal and a second terminal, the first terminal of the current mirror circuitry coupled to the first terminal of the first transistor; and a second transistor having a control terminal coupled to the second terminal of the current mirror circuitry.

20 Claims, 8 Drawing Sheets

METHODS AND APPARATUS TO REGULATE DROPOUT IN VOLTAGE REGULATOR CIRCUITRY

CROSS-REFERENCE TO RELATED APPLICATION

This patent application claims the benefit of and priority to U.S. Provisional Patent Application No. 63/537,908 filed Sep. 12, 2023, which is hereby incorporated herein by reference in its entirety.

TECHNICAL FIELD

This description relates generally to voltage regulators and, more particularly, to methods and apparatus to regulate dropout in voltage regulator circuitry.

BACKGROUND

As electronics continue to advance, systems have become capable of safely operating at increasingly complex operating conditions, such as higher powers and higher speeds. In voltage regulator circuitry, increasingly complex circuitry implements advanced techniques for regulating an input voltage to supply power to a load. Such circuitry allows the voltage regulator circuitry to precisely regulate an input voltage to generate an output voltage despite increasingly complex operating conditions.

SUMMARY

For methods and apparatus to regulate dropout in voltage regulator circuitry, an example circuit includes voltage source circuitry having a terminal; a first transistor having a first terminal and a control terminal, the control terminal of the first transistor coupled to the terminal of the voltage source circuitry; current mirror circuitry having a first terminal and a second terminal, the first terminal of the current mirror circuitry coupled to the first terminal of the first transistor; and a second transistor having a control terminal coupled to the second terminal of the current mirror circuitry. Other examples are described.

For methods and apparatus to regulate dropout in voltage regulator circuitry, an example apparatus includes a transistor having a first terminal and a control terminal; a feedback terminal; error amplifier circuitry having a first terminal and a second terminal, the first terminal of the error amplifier circuitry coupled to the feedback terminal; buffer circuitry having a first terminal and a second terminal; and amplifier circuitry having a first terminal and a second terminal, the first terminal of the amplifier circuitry coupled to the control terminal of the transistor and the first terminal of the buffer circuitry, the second terminal of the amplifier circuitry coupled to the second terminal of the error amplifier circuitry and the second terminal of the buffer circuitry. Other examples are described.

For methods and apparatus to regulate dropout in voltage regulator circuitry, an example apparatus includes a first input terminal configured to receive an input voltage; an output terminal configured to supply an output voltage; a second input terminal configured to supply a feedback voltage, the feedback voltage proportional to the output voltage; regulator circuitry coupled to the first input terminal, the second input terminal, and the output terminal, the regulator circuitry configured to: generate the output voltage using the input voltage based on a first voltage; generate a second voltage based on a difference between the feedback voltage and a first reference voltage; and adjust the first voltage based on the second voltage; and dropout loop circuitry coupled to the first input terminal and the regulator circuitry, the dropout loop circuitry configured to: detect dropout conditions based on the first voltage and a second reference voltage; and after detecting the dropout conditions, compensate the second voltage with a current. Other examples are described.

Figure 1:
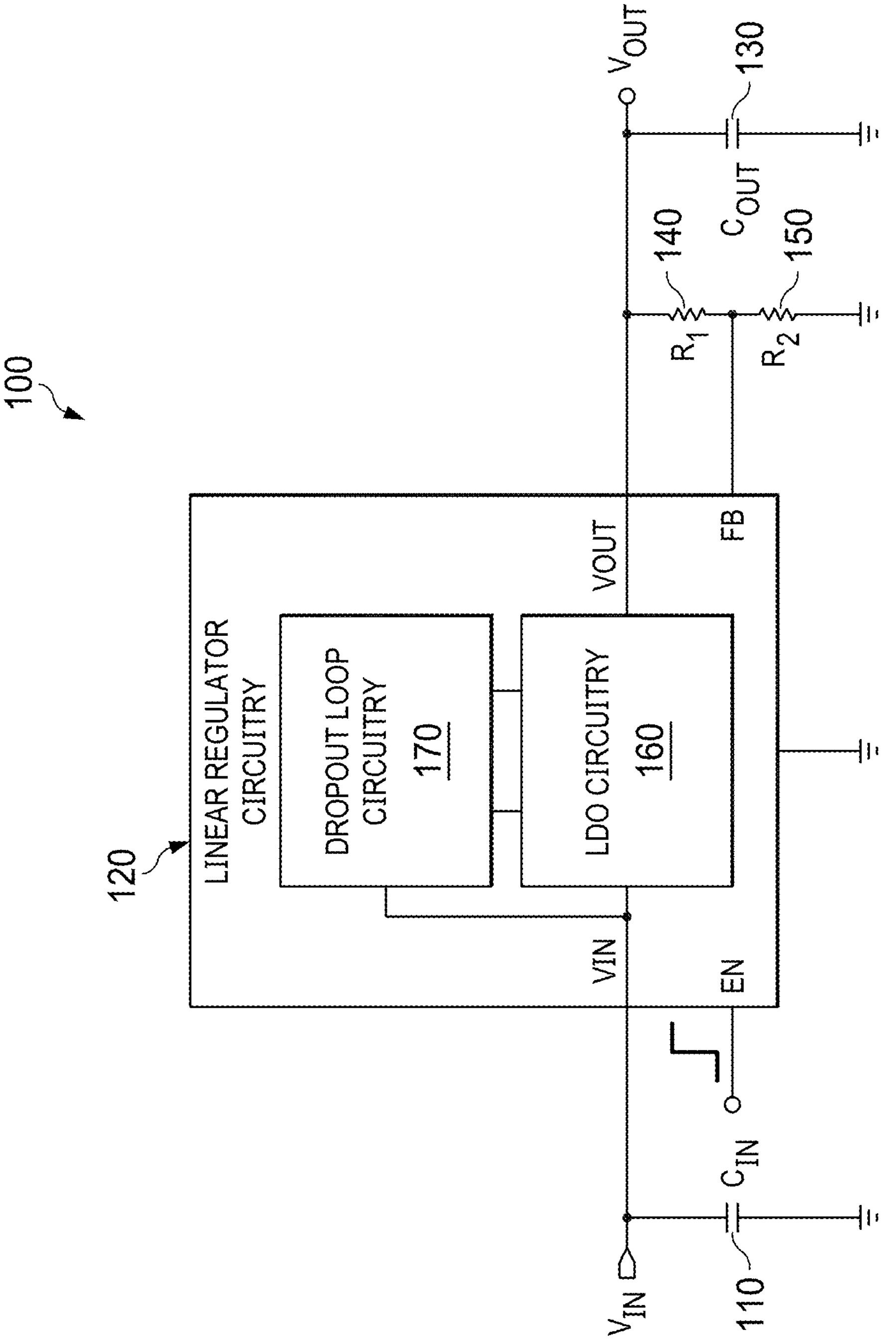
FIG. 1 is a schematic diagram of an example voltage regulator system including example low-dropout (LDO) regulator circuitry and example dropout loop circuitry.

The drawings are not necessarily to scale. Generally, the same reference numbers in the drawing(s) and this description refer to the same or similar (functionally and/or structurally) features and/or parts. Although the drawings show regions with clean lines and boundaries, some or all of these lines and boundaries may be idealized. In reality, the boundaries or lines may be unobservable, blended or irregular.

DETAILED DESCRIPTION

As electronics continue to advance, systems have become capable of safely operating at increasingly complex operating conditions, such as higher powers and higher speeds. In voltage regulator circuitry, increasingly complex circuitry implements advanced techniques for regulating an input voltage to supply power to a load. Such circuitry allows the voltage regulator circuitry to precisely regulate an input voltage to generate an output voltage despite increasingly complex operating conditions.

One type of voltage regulator circuitry is linear regulator circuitry, which generates an output voltage by regulating a supply of power from a power source. In some designs, the linear regulator circuitry utilizes a pass transistor, voltage divider circuitry, error amplifier circuitry, and buffer circuitry to generate the output voltage. The pass transistor receives an input voltage from the power source and a gate control voltage from an adjustment transistor of the buffer circuitry. The pass transistor generates the output voltage by regulating the supply of power from the power source. The voltage divider circuitry, error amplifier circuitry, and buffer circuitry form a feedback loop that uses the output voltage to adjust the gate control voltage. The voltage divider circuitry generates a feedback voltage as a proportional representation of the output voltage. The error amplifier circuitry compares the feedback voltage to a reference feedback voltage to generate an error value. The error value represents the difference between the feedback voltage and the reference feedback voltage. The buffer circuitry adjusts the gate control voltage by controlling the adjustment transistor using the error value.

In operation, linear regulators are capable of generating output voltages that are less than the input voltage from the power source. However, in some conditions, such as a low battery voltage, the input voltage decreases to a voltage below the desired output voltage of the linear regulator. During such operating conditions, the error amplifier circuitry saturates the error value, which causes the buffer circuitry to fully enable the adjustment transistor. When fully enabled, the adjustment transistor drives the gate to maximize the gate-to-source voltage of the pass transistor. Such operations of the linear regulator circuitry are referred to as dropout operations or dropout conditions. During dropout operations, the output voltage of the linear regulator circuitry follows the input voltage from the power source.

During dropout conditions, the error amplifier circuitry saturates the error value to cause the largest possible adjustment of the gate control voltage by the adjustment transistor. When exiting dropout, the input voltage increases to a voltage greater than the desired output voltage of the linear regulator. Delays in updating the error value result in large output voltages when the input voltage suddenly increases, which results in the regulator circuitry supplying relatively large output voltages until the linear regulator circuitry updates the error value. In some devices relatively large output voltages could damage downstream circuitry.

To prevent large voltage spikes when exiting dropout conditions, some designs have substantially increased an output capacitance of the linear regulator circuitry. In these designs, the relatively large capacitance prevents large voltage spikes from being supplied to downstream circuitry. However, as input voltages continue to increase, increasing the output capacitance substantially limits the bandwidth and response time of the regulator circuitry.

Other designs use source follower circuitry to clamp the pass transistor and prevent voltages over a maximum value from being supplied at the output. However, such source follower circuitry has a relatively large die size in comparison to the low impedance pass transistor. Also, during dropout the follower circuitry has a relatively high impedance, which substantially increases the quiescent current consumption of the regulator circuitry. As the clamp size increases, overshoot responsive to exiting dropout could degrade the stability of the regulator circuitry.

Another design implements load current mirror loop circuitry, which uses the current being supplied to a load to generate a reference dropout voltage to drive the regulator circuitry during dropout conditions. Such a reference dropout voltage prevents the regulator circuitry from fully entering dropout conditions, which reduces overshoot when exiting dropout conditions. The load current mirror loop circuitry uses an additional error amplifier and voltage compensation circuitry to adjust the gate control voltage of the pass transistor. In such designs the voltage compensation circuitry increases the area needed to implement the load current mirror loop circuitry, which increases the cost. Also, an additional transistor coupled in parallel with the pass transistor is needed to sense the current to the load. However, such load current loop circuitry substantially increases the quiescent current consumption and is susceptible to changes across PVT.

Yet another design uses additional bias circuitry to constantly preload bias conditions and enhance dropout exit. Additional switches in the linear regulator circuitry cause the bias circuitry to enter enhanced mode when the output crosses an overshoot threshold. However, in relatively high voltage designs, additional area inefficient clamps are coupled to the pass gate to support a low resistance drive mode.

Examples described herein include methods and apparatus to regulate dropout in voltage regulator circuitry using dropout loop circuitry to continue regulation during dropout. In some described examples, the voltage regulator circuitry includes low-dropout (LDO) regulator circuitry and dropout loop circuitry. The LDO regulator circuitry further includes a pass transistor, voltage divider circuitry, error amplifier circuitry, and buffer circuitry. In normal operation, the LDO regulator circuitry generates a gate control voltage to control the pass transistor, which regulates a supply of power from a power source, to generate the output voltage. The error amplifier circuitry generates an error value based on a feedback voltage from the voltage divider circuitry. The error value represents the difference between the actual output voltage and a desired output voltage. The buffer circuitry uses an adjustment transistor to adjust the gate control voltage responsive to the error value. In dropout conditions, the error amplifier circuitry saturates the error value by setting the error value approximately equal to a common potential (e.g., ground). The buffer circuitry fully enables the adjustment transistor to pull down the gate control voltage responsive to such a saturated error value. The dropout loop circuitry supplies a compensation current responsive to detecting an increase in a gate-to-source voltage of the pass transistor. The compensation current sets the adjustment transistor to a state that continues to regulate the gate control voltage.

In some such described examples, the dropout loop circuitry includes reference voltage source circuitry, level shifter circuitry, sense circuitry, and dropout loop gain stage circuitry. The reference voltage source circuitry generates a reference dropout voltage based on the input voltage. The level shifter circuitry generates a shifted reference dropout voltage by level shifting the reference dropout voltage. The level shifter circuitry increases the reference dropout voltage to a voltage that ensures the buffer circuitry sets the adjustment transistor (also referred to as a common source pass gate drive transistor) to have a non-zero drain-to-source voltage. The sense circuitry conducts current responsive to the gate-to-source voltage of the pass transistor increasing to a reference gate-to-source voltage. The reference gate-to-source voltage is set by the reference dropout voltage and represents dropout conditions. The dropout loop gain stage circuitry mirrors the bias current to generate a relatively high-voltage gain. The dropout loop gain stage circuitry uses a low resistance current drive to control the error value and prevent the error amplifier circuitry from setting the error value to a value corresponding to dropout conditions. Thus, the dropout loop gain stage circuitry assumes control of the error value during dropout conditions.

Advantageously, the dropout loop circuitry detects an entry into dropout conditions by comparing the reference dropout voltage to the gate control voltage. Advantageously, the level shifter circuitry ensures that the reference dropout voltage creates a drain-to-source voltage across the adjustment transistor, which controls adjustments to the gate control voltage. Advantageously, dropout loop gain stage circuitry prevents the error amplifier circuitry from controlling the error value during dropout conditions. Advantageously, when exiting dropout conditions, the dropout loop gain stage circuitry sets the error value to a voltage that is relatively close to a voltage that is present during normal conditions (e.g., not dropout conditions). Advantageously, such a voltage allows the regulator circuitry to rapidly compensate the gate control voltage for the increase in the input voltage. Advantageously, the dropout loop circuitry reduces the response time of the voltage regulator circuitry to voltage increases when exiting dropout conditions.

FIG. 1 is a schematic diagram of an example voltage regulator system 100. In the example of FIG. 1, the voltage regulator system 100 includes a first capacitor 110, linear regulator circuitry 120, a second capacitor 130, a first resistor 140, and a second resistor 150. The example linear regulator circuitry 120 of FIG. 1 includes example LDO regulator circuitry 160 and example dropout loop circuitry 170. The voltage regulator system 100 has an input terminal and an output terminal. The input terminal of the voltage regulator system 100 may be coupled to external circuitry, which supplies an input voltage ($V_{IN}$). In some examples, the input terminal of the voltage regulator system 100 is coupled to a power storage device, such as a battery. The output terminal of the voltage regulator system 100 may be coupled to external circuitry, which is structured to receive an output voltage ($V_{OUT}$). In the example of FIG. 1, the voltage regulator system 100 is a step-down regulator, which generates the output voltage less than the input voltage.

The capacitor 110 has a first terminal and a second terminal. The first terminal of the capacitor 110 is coupled to the linear regulator circuitry 120 and the external circuitry, which supplies the input voltage. The second terminal of the capacitor 110 is coupled to a common terminal, which supplies a common potential (e.g., ground, AVSS, etc.). In some examples, the capacitor 110 is referred to as an input capacitor. In such examples, the capacitor 110 is structured to filter relatively high-speed changes in the input voltage and reduce noise.

The linear regulator circuitry 120 has a first terminal, a second terminal, a third terminal, a fourth terminal, and may have a fifth terminal. The first terminal of the linear regulator circuitry 120 is coupled to the capacitor 110 and the external circuitry, which supplies the input voltage. The second terminal of the linear regulator circuitry 120 is coupled to the capacitor 130, the resistor 140, and the external circuitry, which receives the output voltage. The third terminal of the linear regulator circuitry 120 is coupled to the resistors 140, 150. The fourth terminal of the linear regulator circuitry 120 is coupled to the common terminal, which supplies the common potential. The fifth terminal of the linear regulator circuitry 120 may be coupled to external circuitry, which is structured to enable (e.g., turn on) and disable (e.g., turn off) the linear regulator circuitry 120. An example of the linear regulator circuitry 120 is illustrated and described in connection with FIG. 2, below.

The capacitor 130 has a first terminal and a second terminal. The first terminal of the capacitor 130 is coupled to the linear regulator circuitry 120, the resistor 140, and the external circuitry, which receives the output voltage. The second terminal of the capacitor 130 is coupled to the common terminal, which supplies the common potential. In some examples, the capacitor 130 is referred to as an output capacitor. In such examples, the capacitor 130 is structured to filter relatively high-speed changes in the output voltage and reduce noise.

The resistor 140 has a first terminal and a second terminal. The first terminal of the resistor 140 is coupled to the linear regulator circuitry 120, the capacitor 130, and the external circuitry, which receives the output voltage. The second terminal of the resistor 140 is coupled to the linear regulator circuitry 120 and the resistor 150. The resistor 150 has a first terminal and a second terminal. The first terminal of the resistor 150 is coupled to the linear regulator circuitry 120 and the resistor 140. The second terminal of the resistor 150 is coupled to the common terminal, which supplies the common potential. In the example of FIG. 1, the resistors 140, 150 are structured as voltage divider circuitry, which generates a feedback voltage as a proportional representation of the output voltage. Alternatively, the voltage regulator system 100 may be modified to remove or include alternative voltage divider circuitry.

The LDO regulator circuitry 160 has a first terminal, a second terminal, a third terminal, and a fourth terminal. The first terminal of the LDO regulator circuitry 160 is coupled to the capacitor 110, the dropout loop circuitry 170, and the external circuitry, which supplies the input voltage. The second and third terminals of the LDO regulator circuitry 160 are coupled to the dropout loop circuitry 170. The fourth terminal of the LDO regulator circuitry 160 is coupled to the capacitor 130, the resistor 140, and the external circuitry, which receives the output voltage. An example of the LDO regulator circuitry 160 is illustrated and described in connection with FIG. 2, below.

The dropout loop circuitry 170 has a first terminal, a second terminal, and a third terminal. The first terminal of the dropout loop circuitry 170 is coupled to the capacitor 110, the LDO regulator circuitry 160, and the external circuitry that supplies the input voltage. The second and third terminals of the dropout loop circuitry 170 are coupled to the LDO regulator circuitry 160. Examples of the dropout loop circuitry 170 are illustrated and described in connection with FIGS. 2, 3, 4, and 5, below.

In example operation, the voltage regulator system 100 receives the input voltage from an external power source. For example, the voltage regulator system 100 may receive the input voltage from a battery. The capacitor 110 filters relatively high-frequency noise from the input voltage. The linear regulator circuitry 120 receives the filtered input voltage. The linear regulator circuitry 120 generates the output voltage by regulating the input voltage. In the example of FIG. 1, the linear regulator circuitry 120 generates the output voltage to be less than the input voltage. The resistors 140, 150 generate a feedback voltage by dividing the output voltage. The linear regulator circuitry 120 adjusts the regulation of the input voltage based on the feedback voltage. The capacitor 130 filters relatively high-frequency noise from the output voltage and stabilizes the feedback loop formed by the resistors 140, 150.

In such example operations, the LDO regulator circuitry 160 generates a gate control voltage responsive to receiving the input voltage. The LDO regulator circuitry 160 uses the gate control voltage to regulate generation of the output voltage. The LDO regulator circuitry 160 adjusts the gate control voltage in response to a comparison of the feedback voltage to a reference feedback voltage. The reference feedback voltage is a voltage that represents the desired output voltage. In some examples, the dropout loop circuitry 170 generates a dropout reference voltage in reference to the input voltage. In other examples, the dropout loop circuitry 170 generates a dropout reference voltage in reference to the output voltage. In both examples, the dropout reference voltage represents a voltage of the gate control voltage corresponding to dropout conditions. The dropout loop circuitry 170 senses the LDO regulator circuitry 160 is in a dropout condition responsive of a comparison of the gate control voltage to the dropout reference voltage. The dropout loop circuitry 170 assumes control of the gate control voltage responsive to a detection of the dropout condition. The example operations of the linear regulator circuitry 120 of FIG. 1 are further described in connection with FIGS. 2, 3, 4, 5, and 6, below.

Advantageously, the dropout loop circuitry 170 prevents the LDO regulator circuitry 160 from saturating the error value during dropout mode. Advantageously, the dropout loop circuitry 170 sets the gate control voltage to the dropout reference voltage. Advantageously, setting the gate control voltage to the dropout reference voltage causes the LDO regulator circuitry 160 to remain in a regulation state. Advantageously, when exiting dropout mode, the LDO regulator circuitry 160 prevents overshoot in the output voltage responsive to being in a regulation state.

Figure 2:
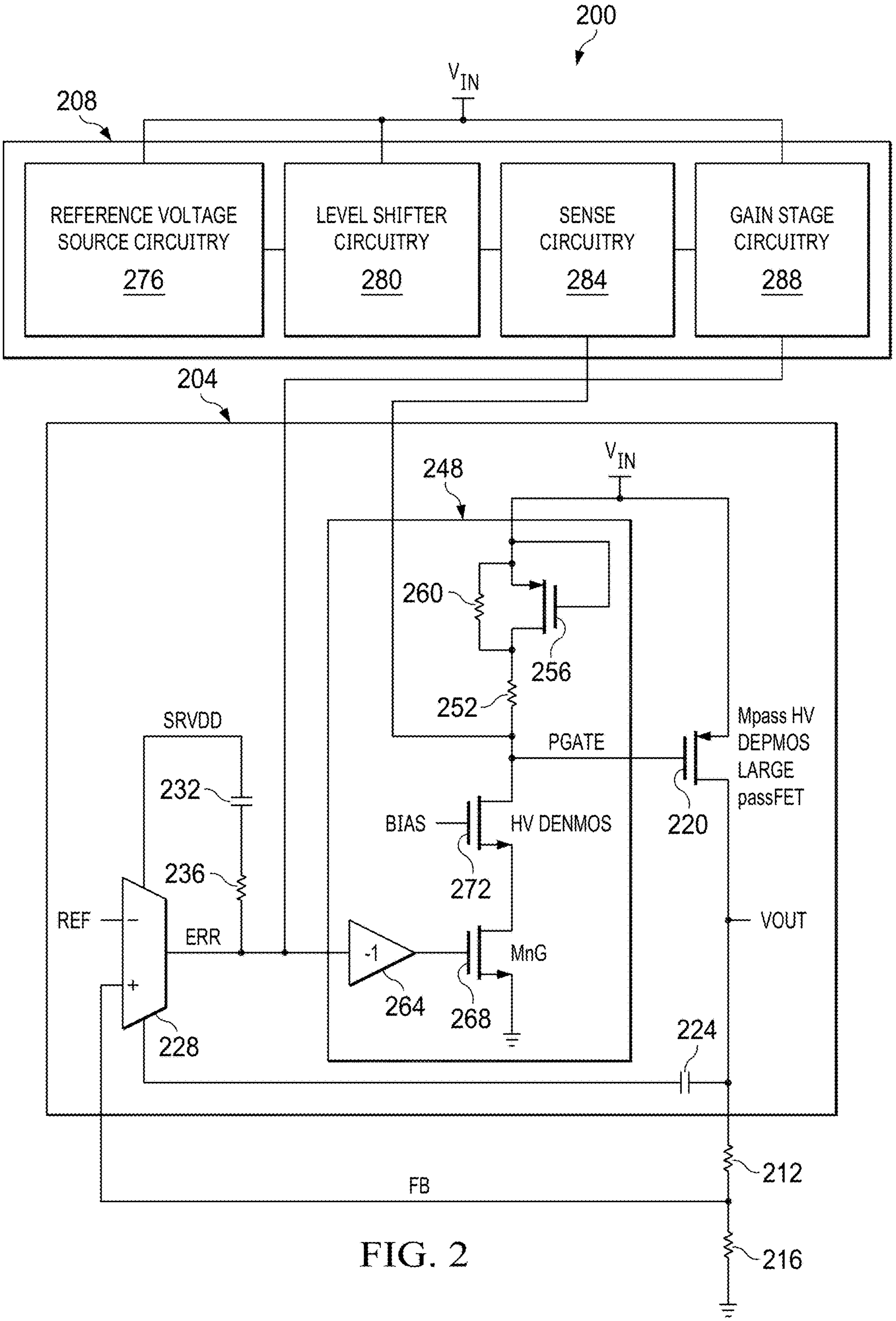
FIG. 2 is a schematic diagram of an example of the LDO regulator circuitry of FIG. 1 and an example of the dropout loop circuitry of FIG. 1, which supports relatively high voltages.

FIG. 2 is a schematic diagram of example linear regulator circuitry 200, which is an example of the linear regulator circuitry 120 of FIG. 1. In the example of FIG. 2, the linear regulator circuitry 200 includes LDO regulator circuitry 204, dropout loop circuitry 208, a first resistor 212, and a second resistor 216. The example LDO regulator circuitry 204 of FIG. 2 includes a first example transistor 220, a first example capacitor 224, example error amplifier circuitry 228, a second example capacitor 232, a third example resistor 236, and example buffer circuitry 248. The example buffer circuitry 248 of FIG. 2 includes a fifth example resistor 252, a second example transistor 256, an example inverter 264, a third example transistor 268, and a fourth example transistor 272. The example dropout loop circuitry 208 of FIG. 2 includes example reference voltage source circuitry 276, example level shifter circuitry 280, example sense circuitry 284, and example gain stage circuitry 288.

The linear regulator circuitry 200 has an input terminal, an output terminal, a feedback terminal, and a reference terminal. The input terminal of the linear regulator circuitry 200 is coupled to external circuitry, which supplies the input voltage ($V_{IN}$). The output terminal of the linear regulator circuitry 200 is structured to be coupled to external circuitry, which receives the output voltage ($V_{OUT}$). The feedback terminal of the linear regulator circuitry 200 is coupled to the resistors 212, 216. The reference terminal of the linear regulator circuitry 200 is structured to be coupled to external circuitry, which supplies a reference feedback voltage. The reference feedback voltage controls the output voltage of the linear regulator circuitry 200. The linear regulator circuitry 200 of FIG. 2 is an example of the linear regulator circuitry 120 of FIG. 1.

The LDO regulator circuitry 204 has a first terminal, a second terminal, a third terminal, a fourth terminal, and a fifth terminal. The first terminal of the LDO regulator circuitry 204 is coupled to the input terminal of the linear regulator circuitry 200, which supplies the input voltage. The second terminal of the LDO regulator circuitry 204 is coupled to the resistor 212 and the output terminal of the linear regulator circuitry 200, which supplies the output voltage. The third and fourth terminals of the LDO regulator circuitry 204 are coupled to dropout loop circuitry 208. The fifth terminal of the LDO regulator circuitry 204 is coupled to the external circuitry, which supplies the reference feedback voltage. The LDO regulator circuitry 204 of FIG. 2 is an example of the LDO regulator circuitry 160 of FIG. 1.

The dropout loop circuitry 208 has a first terminal, a second terminal, and a third terminal. The first terminal of the dropout loop circuitry 208 is coupled to the input terminal of the linear regulator circuitry 200, which supplies the input voltage. The second and third terminals of the dropout loop circuitry 208 are coupled to the LDO regulator circuitry 204. The dropout loop circuitry 208 is an example of the dropout loop circuitry 170 of FIG. 1. Also, examples of the dropout loop circuitry 208 are further illustrated and described in connection with FIGS. 3, 4, and 5, below.

The resistor 212 has a first terminal and a second terminal. The first terminal of the resistor 212 is coupled to the LDO regulator circuitry 204 and the output terminal of the linear regulator circuitry 200, which supplies the output voltage. The second terminal of the resistor 212 is coupled to the LDO regulator circuitry 204 and the resistor 216. The resistor 216 has a first terminal and a second terminal. The first terminal of the resistor 216 is coupled to the LDO regulator circuitry 204 and the resistor 212. The second terminal of the resistor 216 is coupled to the common terminal, which supplies the common potential. In the example of FIG. 2, the resistors 212, 216 are structured as voltage divider circuitry, which generates a feedback voltage as a proportional representation of the output voltage. Although in the example of FIG. 2, the resistors 212, 216 are illustrated as internal to the linear regulator circuitry 200, the resistors 212, 216 may be external to the linear regulator circuitry 200. For example, the resistors 140, 150 of FIG. 1 are external to the linear regulator circuitry 120.

The transistor 220 has a first terminal, a second terminal, and a control terminal. The first terminal of the transistor 220 is coupled to the input terminal of the linear regulator circuitry 200, which supplies the input voltage. The second terminal of the transistor 220 is coupled to the output terminal of the linear regulator circuitry 200. The control terminal of the transistor 220 is coupled to the dropout loop circuitry 208, the buffer circuitry 248, and the resistor 252. In some examples, the transistor 220 is referred to as a pass field-effect transistor (FET). Also, a voltage at the control terminal of the transistor 220 is referred to as a gate control voltage.

The capacitor 224 has a first terminal and a second terminal. The first terminal of the capacitor 224 is coupled to the output terminal of the linear regulator circuitry 200. The second terminal of the capacitor 224 is coupled to the error amplifier circuitry 228. In some examples, the capacitor 224 is structured to stabilize the timing of the error amplifier circuitry 228. In such examples, the capacitor 224 prevents relatively high-speed changes at the output terminal of the linear regulator circuitry 200 from effecting generation of an error value.

The error amplifier circuitry 228 has a first terminal, a second terminal, a third terminal, a fourth terminal, and a fifth terminal. The first terminal of the error amplifier circuitry 228 is coupled to the resistors 212, 216, which supply the feedback voltage. The second terminal of the error amplifier circuitry 228 is coupled to the reference terminal of the linear regulator circuitry 200, which supplies the reference feedback voltage. The third terminal of the error amplifier circuitry 228 is coupled to the capacitor 224. The fourth terminal of the error amplifier circuitry 228 is coupled to an internal supply terminal, which supplies a reference supply voltage (SRVDD). In some examples, the third and fourth terminals of the error amplifier circuitry 228 are referred to as supply terminals. The fifth terminal of the error amplifier circuitry 228 is coupled to the dropout loop circuitry 208, the resistor 236, and the buffer circuitry 248.

The capacitor 232 has a first terminal and a second terminal. The first terminal of the capacitor 232 is coupled to the internal supply terminal, which supplies the reference supply voltage. The second terminal of the capacitor 232 is coupled to the resistor 236. The resistor 236 has a first terminal and a second terminal. The first terminal of the resistor 236 is coupled to the capacitor 232. The second terminal of the resistor 236 is coupled to the dropout loop circuitry 208, the error amplifier circuitry 228, and the buffer circuitry 248.

The buffer circuitry 248 has a first terminal, a second terminal, a third terminal, and a fourth terminal. The first terminal of the buffer circuitry 248 is coupled to the dropout loop circuitry 208, the error amplifier circuitry 228, and the resistor 236. The second terminal of the buffer circuitry 248 is coupled to the dropout loop circuitry 208 and the transistor 220. The third terminal of the buffer circuitry 248 is coupled to a bias terminal, which supplies a bias voltage. The fourth terminal of the buffer circuitry is coupled to the input terminal of the linear regulator circuitry 200.

The resistor 252 has a first terminal and a second terminal. The first terminal of the resistor 252 is coupled to the transistor 256 and the resistor 260. The second terminal of the resistor 252 is coupled to the dropout loop circuitry 208, the transistor 220, and the buffer circuitry 248. The transistor 256 has a first terminal, a second terminal, and a control terminal. The first and control terminals of the transistor 256 are coupled to the input terminal of the linear regulator circuitry 200. The second terminal of the transistor 256 is coupled to the resistors 252, 260. The resistor 260 has a first terminal and a second terminal. The first terminal of the resistor 260 is coupled to the input terminal of the linear regulator circuitry 200. The second terminal of the resistor 260 is coupled to the resistor 252 and the transistor 256.

The inverter 264 has a first terminal and a second terminal. The first terminal of the inverter 264 is coupled to the dropout loop circuitry 208, the error amplifier circuitry 228, and the resistor 236. The second terminal of the inverter 264 is coupled to the transistor 268. In the example of FIG. 2, the inverter 264 is an analog inverter, which inverts analog voltages. The transistor 268 has a first terminal, a second terminal, and a control terminal. The first terminal of the transistor 268 is coupled to the transistor 272. The second terminal of the transistor 268 is coupled to the common terminal, which supplies the common potential. The control terminal of the transistor 268 is coupled to the inverter 264. In some examples, the transistor 268 is referred to as an adjustment transistor. In such examples, the transistor 268 adjusts the gate control voltage by sinking current through the resistors 252, 260.

The transistor 272 has a first terminal, a second terminal, and a control terminal. The first terminal of the transistor 272 is coupled to the dropout loop circuitry 208, the transistor 220, and the resistor 252. The second terminal of the transistor 272 is coupled to the transistor 268. The control terminal of the transistor 272 is coupled to the bias terminal, which supplies the bias voltage. In the example of FIG. 2, the transistor 272 is a drain extended transistor, which allows the drain-to-source voltage of the transistor 272 to be a relatively high voltage, such as twenty volts. In such examples, the bias voltage is set to a value that allows the transistor 272 to have a drain voltage that allows the transistor 268 to be a relatively lower voltage transistor, such as a five-volt transistor.

The reference voltage source circuitry 276 has a first terminal and a second terminal. The first terminal of the reference voltage source circuitry 276 is coupled to the input terminal of the linear regulator circuitry 200, which supplies the input voltage. The second terminal of the reference voltage source circuitry 276 is coupled to the level shifter circuitry 280. Examples of the reference voltage source circuitry 276 are illustrated and described in connection with FIGS. 3, 4, and 5, below.

The level shifter circuitry 280 has a first terminal, a second terminal, and a third terminal. The first terminal of the level shifter circuitry 280 is coupled to the input terminal of the linear regulator circuitry 200, which supplies the input voltage. The second terminal of the level shifter circuitry 280 is coupled to the reference voltage source circuitry 276. The third terminal of the level shifter circuitry 280 is coupled to the sense circuitry 284. Examples of the level shifter circuitry 280 are illustrated and described in connection with FIGS. 3, 4, and 5, below.

The sense circuitry 284 has a first terminal, a second terminal, and a third terminal. The first terminal of the sense circuitry 284 is coupled to the LDO regulator circuitry 204. The second terminal of the sense circuitry 284 is coupled to the level shifter circuitry 280. The third terminal of the sense circuitry 284 is coupled to the gain stage circuitry 288. Examples of the sense circuitry 284 are illustrated and described in connection with FIGS. 3, 4, and 5, below.

The gain stage circuitry 288 has a first terminal, a second terminal, and a third terminal. The first terminal of the gain stage circuitry 288 is coupled to the input terminal of the linear regulator circuitry 200, which supplies the input voltage. The second terminal of the gain stage circuitry 288 is coupled to the LDO regulator circuitry 204. The third terminal of the gain stage circuitry 288 is coupled to the sense circuitry 284. Examples of the sense circuitry 284 are illustrated and described in connection with FIGS. 3, 4, and 5, below.

In the example of FIG. 2, the transistor 220 is a p-channel metal-oxide semiconductor field-effect transistor (MOSFET). Alternatively, the transistor 220 may be a p-channel field-effect transistor (FET), a p-channel insulated-gate bipolar transistor (IGBT), a p-channel junction field effect transistor (JFET), a PNP bipolar junction transistor (BJT) or, with slight modifications, an n-type equivalent device. In the example of FIG. 2, the transistors 256, 268, 272 are n-channel MOSFETs. Alternatively, the transistors 256, 268, 272 may be n-channel FETs, n-channel IGBTs, n-channel JFETs, NPN BJTs, or, with slight modifications, p-type equivalent devices. The transistors 220, 256, 268, 272 may be depletion mode devices, drain-extended devices, enhancement mode devices, natural transistors or other type of device structure transistors. Furthermore, the transistors 220, 256, 268, 272 may be implemented in/over a silicon substrate (Si), a silicon carbide substrate (SiC), a gallium nitride substrate (GaN) or a gallium arsenide substrate (GaAs).

In example operation, the resistors 252, 260 and the transistor 256 generate a gate control voltage responsive to receiving an input voltage from external circuitry. The transistor 220 begins to regulate a supply of power from the external circuitry responsive to the gate control voltage. The resistors 212, 216 and downstream circuitry that is coupled to the output terminal of the linear regulator circuitry 200 receive the output voltage. The resistors 212, 216 generate a feedback voltage by dividing the output voltage. The error amplifier circuitry 228 generates an error value (ERR) responsive to a comparison of the feedback voltage to a reference feedback voltage. In some examples, the error amplifier circuitry 228 generates an error value between the internal reference voltage and a common potential. In such examples, the error amplifier circuitry 228 decreases the error value as the difference between the reference feedback voltage and the feedback voltage increases. The error amplifier circuitry 228 saturates the error value responsive to differences between the reference feedback voltage and the feedback voltage greater than a threshold value.

In such example operations, the inverter 264 inverts the error value. The inverter 264 uses the inverted error value to control the transistor 268. The transistor 268 (also referred to as the adjustment transistor) adjusts the gate control voltage by sinking a current from the resistors 252, 260 and the transistor 256. Increasing the current through the transistor 268 increases the current through the resistors 252, 260, which decreases the gate control voltage and increases the gate-to-source voltage of the transistor 220. When the error amplifier circuitry 228 saturates the error value, the inverted error value increases the gate-to-source voltage of the transistor 268, which strongly pulls down the gate control voltage. However, the dropout loop circuitry 208 assumes control of the error value at the output of the error amplifier circuitry 228 responsive to the transistor 268 strongly pulling down the gate control voltage of the transistor 220.

Also in such example operations, the reference voltage source circuitry 276 generates a reference dropout voltage, which represents a value of the gate control voltage that corresponds to dropout conditions. The level shifter circuitry 280 shifts the reference dropout voltage to set a drain-to-source voltage of the transistor 268 to a voltage greater than zero. The sense circuitry 284 conducts current responsive to the gate control voltage being less than the level shifted reference voltage. The gain stage circuitry 288 mirrors the current of the sense circuitry 284 to generate a relatively high-voltage gain. The gain stage circuitry 288 assumes control of the error value from the error amplifier circuitry 228 by driving the inverter 264. When the gain stage circuitry 288 is controlling the error value, the error amplifier circuitry 228 cannot saturate the error value. The inverter 264 uses the pulled-up error value to control the transistor 268, which continues to regulate the gate control voltage during dropout. Further example operations of the linear regulator circuitry 200 are further illustrated and described in connection with FIG. 6, below.

Figure 3:
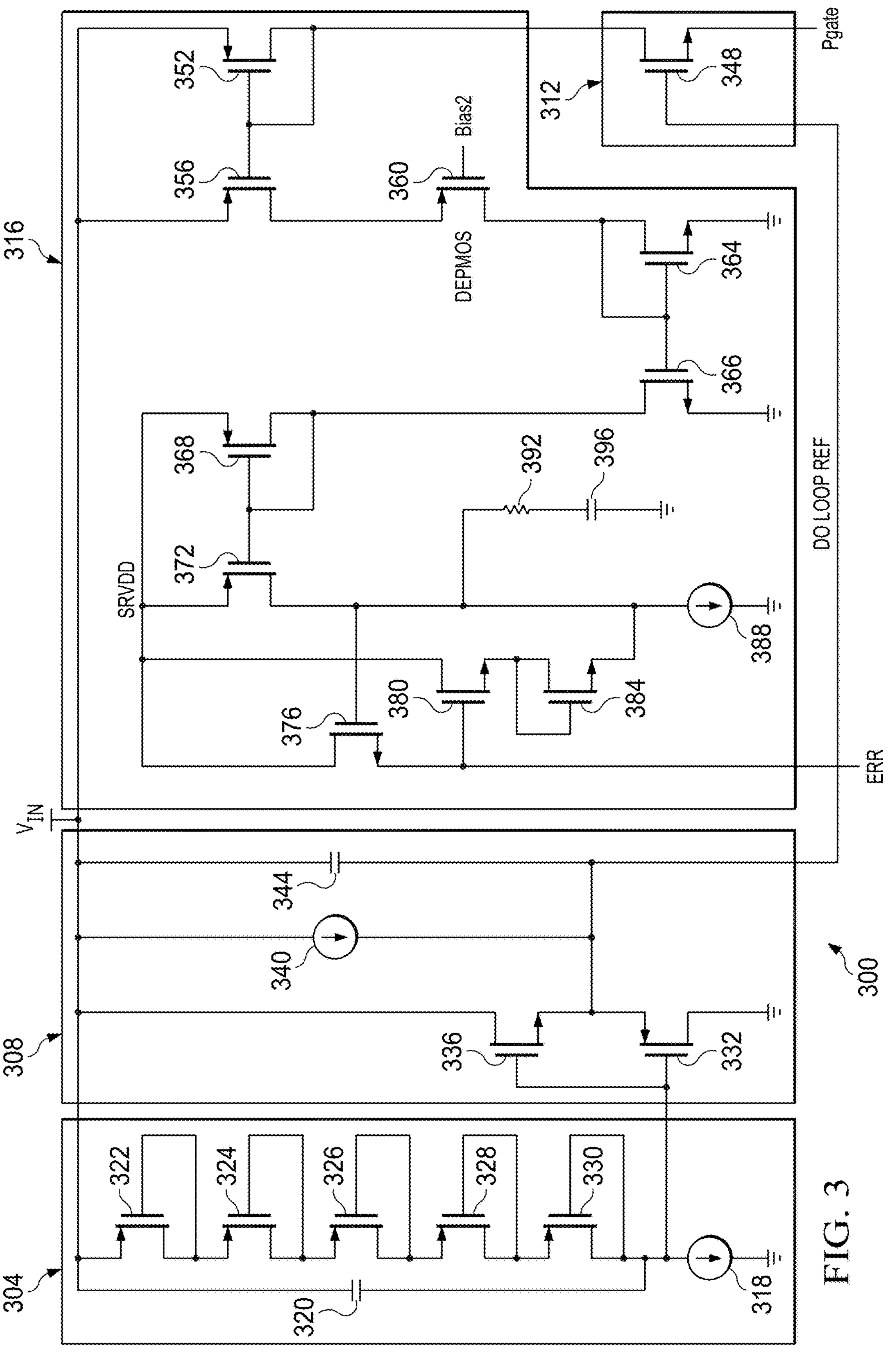
FIG. 3 is a schematic diagram of an example of the dropout loop circuitry of FIGS. 1 and 2.

FIG. 3 is a schematic diagram of example dropout loop circuitry 300, which is an example of the dropout loop circuitry 170, 208 of FIGS. 1 and 2. In the example of FIG. 3, the dropout loop circuitry 300 includes reference voltage source circuitry 304, level shifter circuitry 308, sense circuitry 312, and gain stage circuitry 316. The example reference voltage source circuitry 304 of FIG. 3 includes first example current source circuitry 318, a first example capacitor 320, a first example transistor 322, a second example transistor 324, a third example transistor 326, a fourth example transistor 328, and a fifth example transistor 330. The example level shifter circuitry 308 of FIG. 3 includes a sixth example transistor 332, a seventh example transistor 336, second example current source circuitry 340, and a second example capacitor 344. The example sense circuitry 312 of FIG. 3 includes an eighth example transistor 348. The example gain stage circuitry 316 of FIG. 3 includes a ninth example transistor 352, a tenth example transistor 356, an eleventh example transistor 360, a twelfth example transistor 364, a thirteenth example transistor 366, a fourteenth example transistor 368, a fifteenth example transistor 372, a sixteenth example transistor 376, a seventeenth example transistor 380, an eighteenth example transistor 384, third example current source circuitry 388, an example resistor 392, and a third example capacitor 396.

The dropout loop circuitry 300 has a first input terminal, a second input terminal, and an output terminal. The first input terminal of the dropout loop circuitry 300 may be coupled to the input terminal of the linear regulator circuitry 120, 200 of FIGS. 1 and 2, which supplies the input voltage ($V_{IN}$). The second input terminal of the dropout loop circuitry 300 may be coupled to the control terminal of the transistor 220 of FIG. 2, or more generally the LDO regulator circuitry 160, 204 of FIGS. 1 and 2, which supplies the gate control voltage (Pgate). The output terminal of the dropout loop circuitry 300 is coupled to the buffer circuitry 248 of FIG. 2, or more generally the LDO regulator circuitry 160, 204.

The reference voltage source circuitry 304 is coupled to the level shifter circuitry 308, the first input terminal of the dropout loop circuitry 300, which supplies the input voltage, and the common terminal, which supplies the common potential. The reference voltage source circuitry 304 is an example of the reference voltage source circuitry 276 of FIG. 2. The level shifter circuitry 308 is coupled to the reference voltage source circuitry 304, the sense circuitry 312, the first input terminal of the dropout loop circuitry 300, which supplies the input voltage, and the common terminal, which supplies the common potential. The level shifter circuitry 308 is an example of the level shifter circuitry 280 of FIG. 2. The sense circuitry 312 is coupled to the level shifter circuitry 308, the gain stage circuitry 316, and the second input terminal of the dropout loop circuitry 300, which supplies the gate control voltage. The sense circuitry 312 is an example of the sense circuitry 284 of FIG. 2. The gain stage circuitry 316 is coupled to the sense circuitry 312, the first input terminal of the dropout loop circuitry 300, which supplies the input voltage, the common terminal, which supplies the common potential, and the output terminal of the dropout loop circuitry 300, which supplies an error value (Err). The gain stage circuitry 316 is an example of the gain stage circuitry 288 of FIG. 2.

The current source circuitry 318 has a first terminal and a second terminal. The first terminal of the current source circuitry 318 is coupled to the capacitor 320, the transistor 330, and the level shifter circuitry 308. The second terminal of the current source circuitry 318 is coupled to the common terminal, which supplies the common potential. The capacitor 320 has a first terminal and a second terminal. The first terminal of the capacitor 320 is coupled to the first input terminal of the dropout loop circuitry 300, which supplies the input voltage. The second terminal of the capacitor 320 is coupled to the level shifter circuitry 308, the current source circuitry 318, and the transistor 330.

The transistor 322 has a first terminal, a second terminal, and a control terminal. The first terminal of the transistor 322 is coupled to the input terminal of the dropout loop circuitry 300, which supplies the input voltage. The second and control terminals of the transistor 322 are coupled to the transistor 324. The transistor 324 has a first terminal, a second terminal, and a control terminal. The first terminal of the transistor 324 is coupled to the transistor 322. The second and control terminals of the transistor 324 are coupled to the transistor 326. The transistor 326 has a first terminal, a second terminal, and a control terminal. The first terminal of the transistor 326 is coupled to the transistor 324. The second and control terminals of the transistor 326 are coupled to the transistor 328. The transistor 328 has a first terminal, a second terminal, and a control terminal. The first terminal of the transistor 328 is coupled to the transistor 326. The second and control terminals of the transistor 328 are coupled to the transistor 330. The transistor 330 has a first terminal, a second terminal, and a control terminal. The first terminal of the transistor 330 is coupled to the transistor 328. The second and control terminals of the transistor 330 are coupled to the level shifter circuitry 308, the current source circuitry 318, and the capacitor 320. In the example of FIG. 3, the transistors 322, 324, 326, 328, 330 are structured as voltage source circuitry, which generates a reference voltage in relation to the input voltage. Alternatively, the dropout loop circuitry 300 may be modified to replace the transistors 322, 324, 326, 328, 330 with alternative voltage source circuitry, such as a band gap referenced resistor.

The transistor 332 has a first terminal, a second terminal, and a control terminal. The first terminal of the transistor 332 is coupled to the sense circuitry 312, the transistor 336, the current source circuitry 340, and the capacitor 344. The second terminal of the transistor 332 is coupled to the common terminal, which supplies the common potential. The control terminal of the transistor 332 is coupled to the reference voltage source circuitry 304 and the transistor 336. The transistor 336 has a first terminal, a second terminal, and a control terminal. The first terminal of the transistor 336 is coupled to the first input terminal of the dropout loop circuitry 300, which supplies the input voltage. The second terminal of the transistor 336 is coupled to the sense circuitry 312, the transistor 332, the current source circuitry 340, and the capacitor 344. The control terminal of the transistor 336 is coupled to the reference voltage source circuitry 304 and the transistor 332.

The current source circuitry 340 has a first terminal and a second terminal. The first terminal of the current source circuitry 340 is coupled to the input terminal of the dropout loop circuitry 300, which supplies the input voltage. The second terminal of the current source circuitry 340 is coupled to the sense circuitry 312, the transistors 332, 336, and the capacitor 344. The capacitor 344 has a first terminal and a second terminal. The first terminal of the capacitor 344 is coupled to the first input terminal of the dropout loop circuitry 300, which supplies the input voltage. The second terminal of the capacitor 344 is coupled to the sense circuitry 312, the transistors 332, 336, and the current source circuitry 340.

The transistor 348 has a first terminal, a second terminal, and a control terminal. The first terminal of the transistor 348 is coupled to the gain stage circuitry 316. The second terminal of the transistor 348 is coupled to the second input terminal of the dropout loop circuitry 300, which supplies the gate control voltage. The control voltage of the transistor 348 is coupled to the level shifter circuitry 308.

The transistor 352 has a first terminal, a second terminal, and a control terminal. The first terminal of the transistor 352 is coupled to the input terminal of the dropout loop circuitry 300 that supplies the input voltage. The second and control terminals of the transistor 352 are coupled to the sense circuitry 312 and the transistor 356. The transistor 356 has a first terminal, a second terminal, and a control terminal. The first terminal of the transistor 356 is coupled to the first input terminal of the dropout loop circuitry 300 that supplies the input voltage. The second terminal of the transistor 356 is coupled to the transistor 360. The control terminal of the transistor 356 is coupled to the sense circuitry 312 and the transistor 352. In the example of FIG. 3, the transistors 352, 356 are structured as current mirror circuitry, which mirrors the current through the transistor 348. Alternatively, the dropout loop circuitry 300 may be modified to remove or replace the transistors 352, 356 with alternative current mirror circuitry.

The transistor 360 has a first terminal, a second terminal, and a control terminal. The first terminal of the transistor 360 is coupled to the transistor 356. The second terminal of the transistor 360 is coupled to the transistor 364. The control terminal of the transistor 360 is coupled to a bias terminal, which receives a bias voltage (Bias). In the example of FIG. 3, the transistor 360 is a drain extended transistor, which allows the drain-to-source voltage of the transistor 360 to be relatively high. In such examples, the bias voltage is set to a value that allows the transistor 360 to have a drain voltage that allows the transistors 364, 366, 368, 372, 376, 380, 384 to be relatively lower voltage transistors. Alternatively, in low voltage designs, such as in FIG. 5, the dropout loop circuitry 300 may not include the transistor 360.

The transistor 364 has a first terminal, a second terminal, and a control terminal. The first and control terminals of the transistor 364 are coupled to the transistors 360, 366. The second terminal of the transistor 364 is coupled to the common terminal, which supplies the common potential. The transistor 366 has a first terminal, a second terminal, and a control terminal. The first terminal of the transistor 366 is coupled to the transistors 368, 372. The second terminal of the transistor 366 is coupled to the common terminal, which supplies the common potential. The control terminal of the transistor 366 is coupled to the transistors 360, 364. In the example of FIG. 3, the transistors 364, 366 are structured as current mirror circuitry, which mirrors the current through the transistors 356, 360. Alternatively, the dropout loop circuitry 300 may be modified to remove or replace the transistors 364, 366 with alternative current mirror circuitry.

The transistor 368 has a first terminal, a second terminal, and a control terminal. The first terminal of the transistor 368 is coupled to an internal supply terminal, which supplies a reference supply voltage (SRVDD). The second and control terminals of the transistor 368 are coupled to the transistors 366, 372. The transistor 372 has a first terminal, a second terminal, and a control terminal. The first terminal of the transistor 372 is coupled to the internal supply terminal, which supplies the reference supply voltage. The second terminal of the transistor 372 is coupled to the transistors 376, 384, the current source circuitry 388, and the resistor 392. The control terminal of the transistor 372 is coupled to the transistors 366, 368. In the example of FIG. 3, the transistors 368, 372 are structured as current mirror circuitry, which mirrors the current through the transistor 366. Alternatively, the dropout loop circuitry 300 may be modified to remove or replace the transistors 368, 372 with alternative current mirror circuitry.

The transistor 376 has a first terminal, a second terminal, and a control terminal. The first terminal of the transistor 376 is coupled to the internal supply terminal, which supplies the reference supply voltage. The second terminal of the transistor 376 is coupled to the transistor 380 and the output terminal of the dropout loop circuitry 300. The control terminal of the transistor 376 is coupled to the transistors 372, 384, the current source circuitry 388, and the resistor 392.

The transistor 380 has a first terminal, a second terminal, and a control terminal. The first terminal of the transistor 380 is coupled to the internal supply terminal, which supplies the reference supply voltage. The second terminal of the transistor 380 is coupled to the transistor 384. The control terminal of the transistor 380 is coupled to the transistor 376 and the output terminal of the dropout loop circuitry 300.

The transistor 384 has a first terminal, a second terminal, and a control terminal. The first and control terminals of the transistor 384 are coupled to the transistor 380. The second terminal of the transistor 384 is coupled to the transistors 372, 376, the current source circuitry 388, and the resistor 392.

The current source circuitry 388 has a first terminal and a second terminal. The first terminal of the current source circuitry 388 is coupled to the transistors 372, 376, 384 and the resistor 392. The second terminal of the current source circuitry 388 is coupled to the common terminal, which supplies the common potential.

The resistor 392 has a first terminal and a second terminal. The first terminal of the resistor 392 is coupled to the transistors 372, 376, 384 and the current source circuitry 388. The second terminal of the resistor 392 is coupled to the capacitor 396. The capacitor 396 has a first terminal and a second terminal. The first terminal of the capacitor 396 is coupled to the resistor 392. The second terminal of the capacitor 396 is coupled to the common terminal, which supplies the common potential. In the example of FIG. 3, the resistor 392 and the capacitor 396 are structured as frequency compensation circuitry, which has a timing constant. The timing constant of the resistor 392 and the capacitor 296 stabilizes the loop formed between the dropout loop circuitry 300 and the LDO regulator circuitry 160, 204. Alternatively, the dropout loop circuitry 300 may be modified to remove or replace the resistor 392 and capacitor 396 with alternative circuitry to stabilize the dropout loop circuitry 300.

In the example of FIG. 3, the transistors 322, 324, 326, 328, 330, 332, 352, 356, 360, 368, 372 are p-channel MOSFETs. Alternatively, the transistors 322, 324, 326, 328, 330, 332, 352, 356, 360, 368, 372 may be p-channel FETs, p-channel IGBTs, p-channel JFETs, PNP BJTs or, with slight modifications, n-type equivalent devices. In the example of FIG. 3, the transistors 336, 348, 364, 366, 376, 380, 384 are n-channel MOSFETs. Alternatively, the transistors 336, 348, 364, 366, 376, 380, 384 may be n-channel FETs, n-channel IGBTs, n-channel JFETs, NPN BJTs, or, with slight modifications, p-type equivalent devices. The transistors 322, 324, 326, 328, 330, 332, 336, 348, 352, 356, 360, 364, 366, 376, 380, 384 may be depletion mode devices, drain-extended devices, enhancement mode devices, natural transistors or other type of device structure transistors. Furthermore, the transistors 322, 324, 326, 328, 330, 332, 336, 348, 352, 356, 360, 364, 366, 376, 380, 384 may be implemented in/over a silicon substrate (Si), a silicon carbide substrate (SiC), a gallium nitride substrate (GaN) or a gallium arsenide substrate (GaAs).

In example operations, the reference voltage source circuitry 304 generates the dropout reference voltage to be the voltage difference across the transistors 322, 324, 326, 328, 330. In operation, the transistors 322, 324, 326, 328, 330 and the capacitor 320 hold the dropout reference voltage as the input voltage changes. The level shifter circuitry 308 shifts the dropout reference voltage by the gate-to-source voltage of the transistor 332. The transistor 336 is a natural transistor that ensures the shifted dropout reference voltage remains larger than the reference voltage during relatively large voltage transients when using the capacitor 344.

In such example operations, the sense circuitry 312 conducts current responsive to the gate control voltage decreasing to a value approximately a threshold voltage less than the shifted dropout reference voltage. The transistor 348 conducts current responsive to such a gate control voltage. The transistors 352, 356 mirror the current through the transistor 348. The transistor 360 allows the transistors 364, 366 to mirror the current through the transistor 356 using relatively low voltage transistors. The transistors 368, 372 mirror the current through the transistor 366. In some examples, the transistors 368, 372 are sized to amplify the current through the transistor 366. The transistor 372 uses a relatively high voltage gain of the current to generate a drive voltage to control the transistor 376. The transistor 376 drives the error value of the LDO regulator circuitry 160, 204 responsive to the drive voltage from the transistor 372. The transistor 376 prevents the error value from being saturated. Further example operations of the dropout loop circuitry 300 are illustrated and described in connection with FIG. 6, below.

Figure 4:
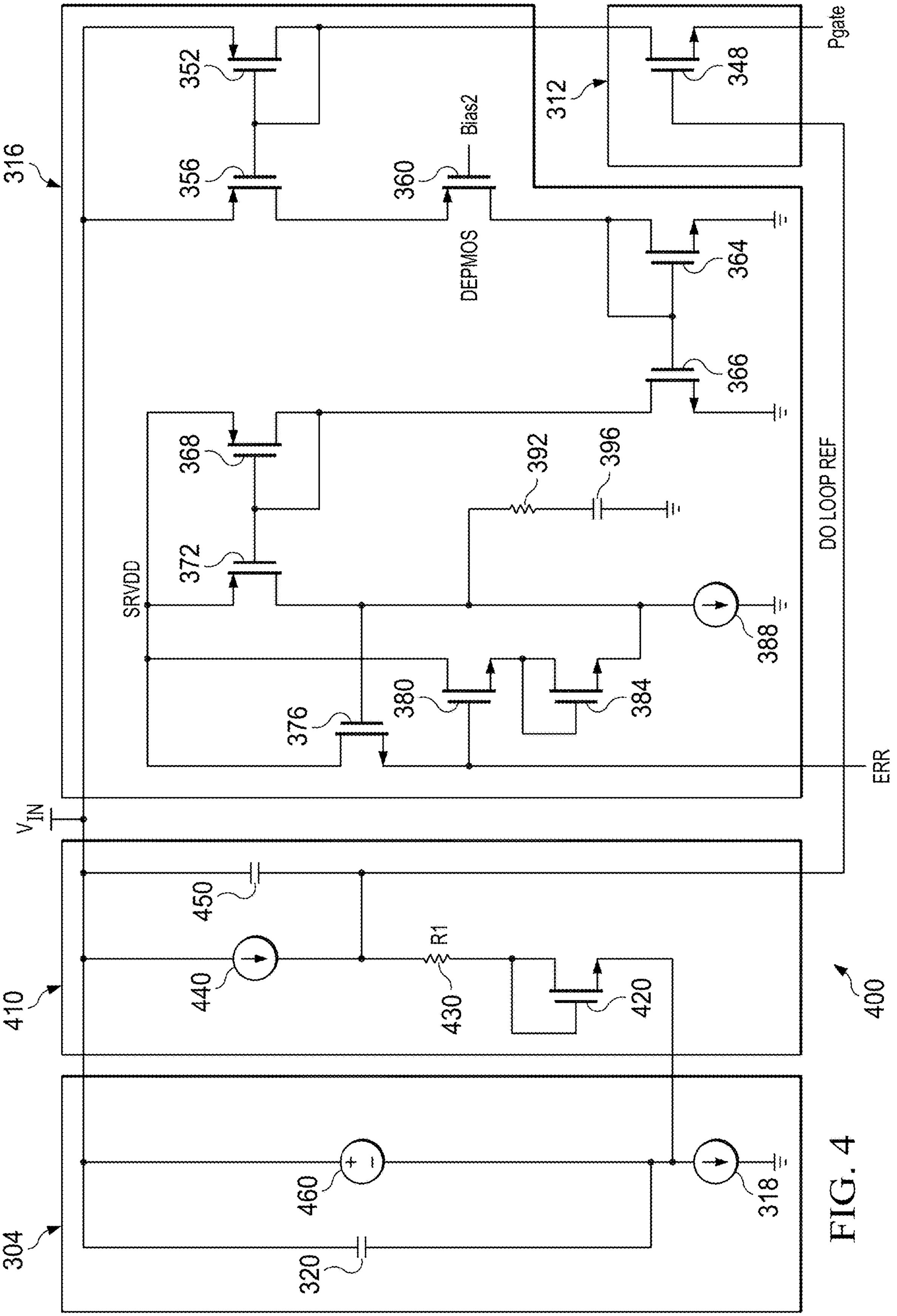
FIG. 4 is a schematic diagram of another example of the dropout loop circuitry of FIGS. 1, 2, and 3.

FIG. 4 is a schematic diagram of example dropout loop circuitry 400, which is another example of the dropout loop circuitry 170, 208, 300 of FIGS. 1, 2, and 3. In the example of FIG. 4, the dropout loop circuitry 400 includes the reference voltage source circuitry 304 of FIG. 3, the sense circuitry 312 of FIG. 3, the gain stage circuitry 316 of FIG. 3, and level shifter circuitry 410. The example sense circuitry 312 of FIG. 4 includes the transistor 348 of FIG. 3. The example gain stage circuitry 316 of FIG. 4 includes the transistors 352, 356, 360, 364, 366, 368, 372, 376, 380, 384 of FIG. 3, the current source circuitry 388 of FIG. 3, the resistor 392, and the capacitor 396 of FIG. 3. The example level shifter circuitry 410 of FIG. 4 includes an example transistor 420, an example resistor 430, example current source circuitry 440, and an example capacitor 450. The example reference voltage source circuitry 304 of FIG. 4 includes the current source circuitry 318 of FIG. 3, the capacitor 320 of FIG. 3, and an example voltage source circuitry 460.

The dropout loop circuitry 400 has a first input terminal, a second input terminal, and an output terminal. The first input terminal of the dropout loop circuitry 400 may be coupled to the input terminal of the linear regulator circuitry 120, 200 of FIGS. 1 and 2, which supplies the input voltage ($V_{IN}$). The second input terminal of the dropout loop circuitry 400 may be coupled to the control terminal of the transistor 220 of FIG. 2, or more generally the LDO regulator circuitry 160, 204 of FIGS. 1 and 2, which supplies the gate control voltage (Pgate). The output terminal of the dropout loop circuitry 400 is coupled to the buffer circuitry 248 of FIG. 2, or more generally the LDO regulator circuitry 160, 204. The dropout loop circuitry 400 is another example of the dropout loop circuitry 300 of FIG. 3.

The level shifter circuitry 410 has a first terminal, a second terminal, and a third terminal. The first terminal of the level shifter circuitry 410 is coupled to the reference voltage source circuitry 304. The second terminal of the level shifter circuitry 410 is coupled to the input terminal of the dropout loop circuitry 400, which supplies the input voltage. The third terminal of the level shifter circuitry 410 is coupled to the sense circuitry 312. The level shifter circuitry 410 is another example of the level shifter circuitry 308 of FIG. 3.

The transistor 420 has a first terminal, a second terminal, and a control terminal. The first and control terminals of the transistor 420 are coupled to the resistor 430. The second terminal of the transistor 420 is coupled to the reference voltage source circuitry 304. The resistor 430 has a first terminal and a second terminal. The first terminal of the resistor 430 is coupled to the sense circuitry 312, the current source circuitry 440, and the capacitor 450. The second terminal of the resistor 430 is coupled to the transistor 420. The current source circuitry 440 has a first terminal and a second terminal. The first terminal of the current source circuitry 440 is coupled to the input terminal of the dropout loop circuitry 400, which supplies the input voltage. The second terminal of the current source circuitry 440 is coupled to the sense circuitry 312, the resistor 430, and the capacitor 450. The capacitor 450 has a first terminal and a second terminal. The first terminal of the capacitor 450 is coupled to the input terminal of the dropout loop circuitry 400, which supplies the input voltage. The second terminal of the capacitor 450 is coupled to the sense circuitry 312, the resistor 430, and the current source circuitry 440.

The voltage source circuitry 460 has a first terminal and a second terminal. The first terminal of the voltage source circuitry 460 is coupled to the input terminal of the dropout loop circuitry 400, which supplies the input voltage. The second terminal of the voltage source circuitry 460 is coupled to the current source circuitry 318, the capacitor 320, and the level shifter circuitry 410. In the example of FIG. 4, the voltage source circuitry 460 is an alternative reference band gap voltage source to the transistors 322, 324,326, 328, 330 of FIG. 3. Alternatively, the voltage source circuitry 460 may be replaced with alternative voltage source circuitry.

In the example of FIG. 4, the transistor 420 is an n-channel MOSFET. Alternatively, the transistor 420 may be an n-channel FET, an n-channel IGBT, an n-channel JFET, an NPN BJT, or, with slight modifications, a p-type equivalent device. The transistor 420 may be depletion mode device, drain-extended device, enhancement mode device, natural transistor or other type of device structure transistor. Furthermore, the transistor 420 may be implemented in/over a silicon substrate (Si), a silicon carbide substrate (SiC), a gallium nitride substrate (GaN) or a gallium arsenide substrate (GaAs).

In example operation, the transistor 420 shifts the reference dropout voltage from the reference voltage source circuitry 304 by approximately a threshold voltage. The resistor 430 and the current source circuitry 440 are structured to generate a voltage difference. The resistor 430 shifts the reference dropout voltage by the voltage difference. The level shifter circuitry 410 supplies the shifted reference dropout voltage to the sense circuitry 312. Further example operations of the dropout loop circuitry 400 are illustrated and described in connection with FIG. 6, below.

Figure 5:
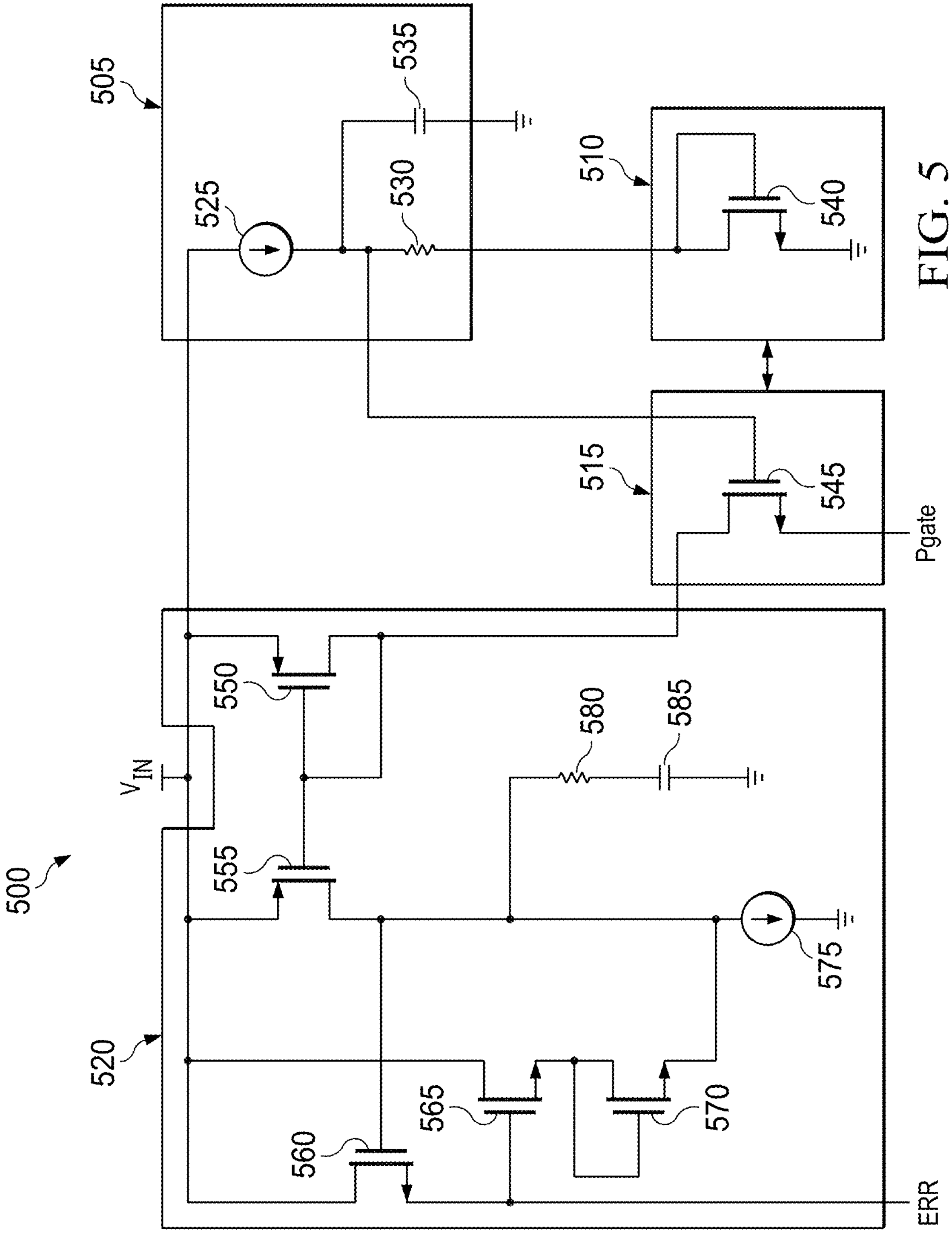
FIG. 5 is a schematic diagram of yet another example of the dropout loop circuitry of FIGS. 1, 2, 3, and 4 as a relatively low voltage system.

FIG. 5 is a schematic diagram of example dropout loop circuitry 500, which is yet another example of the dropout loop circuitry 170, 208, 300, 400 of FIGS. 1, 2, 3, and 4. In the example of FIG. 5, the dropout loop circuitry 500 includes reference voltage source circuitry 505, level shifter circuitry 510, sense circuitry 515, and gain stage circuitry 520. The example reference voltage source circuitry 505 of FIG. 5 includes first example current source circuitry 525, a first example resistor 530, and a first example capacitor 535. The example level shifter circuitry 510 of FIG. 5 includes a first example transistor 540. The example sense circuitry 515 of FIG. 5 includes a second example transistor 545. The example gain stage circuitry 520 of FIG. 5 includes a third example transistor 550, a fourth example transistor 555, a sixth example transistor 560, a seventh example transistor 565, an eighth example transistor 570, second example current source circuitry 575, a second example resistor 580, and a second example capacitor 585.

The dropout loop circuitry 500 has a first input terminal, a second input terminal, and an output terminal. The first input terminal of the dropout loop circuitry 500 may be coupled to the input terminal of the linear regulator circuitry 120, 200 of FIGS. 1 and 2, which supplies the input voltage ($V_{IN}$). The second input terminal of the dropout loop circuitry 500 may be coupled to the control terminal of the transistor 220 of FIG. 2, or more generally the LDO regulator circuitry 160, 204 of FIGS. 1 and 2, which supplies the gate control voltage (Pgate). The output terminal of the dropout loop circuitry 500 is coupled to the buffer circuitry 248 of FIG. 2, or more generally the LDO regulator circuitry 160, 204. The dropout loop circuitry 500 is another example of the dropout loop circuitry 300, 400 of FIGS. 3 and 4.

The reference voltage source circuitry 505 has a first terminal, a second terminal, a third terminal, and a fourth terminal. The first terminal of the reference voltage source circuitry 505 is coupled to the first input terminal of the dropout loop circuitry 500, which supplies the input voltage. The second terminal of the reference voltage source circuitry 505 is coupled to the common terminal, which supplies the common potential. The third terminal of the reference voltage source circuitry 505 is coupled to the level shifter circuitry 510. The fourth terminal of the reference voltage source circuitry 505 is coupled to the sense circuitry 515. The reference voltage source circuitry 505 is another example of the reference voltage source circuitry 276, 304 of FIGS. 2, 3, and 4.

The level shifter circuitry 510 has a first terminal and a second terminal. The first terminal of the level shifter circuitry 510 is coupled to the common terminal, which supplies the common potential. The second terminal of the level shifter circuitry 510 is coupled to the reference voltage source circuitry 505. The level shifter circuitry 510 is another example of the level shifter circuitry 280, 308, 410 of FIGS. 2, 3, and 4.

The sense circuitry 515 has a first terminal, a second terminal, and a third terminal. The first terminal of the sense circuitry 515 is coupled to the second input terminal of the dropout loop circuitry 500, which supplies the gate control voltage. The second terminal of the sense circuitry 515 is coupled to the reference voltage source circuitry 505. The third terminal of the sense circuitry 515 is coupled to the gain stage circuitry 520.

The gain stage circuitry 520 has a first terminal, a second terminal, a third terminal, and a fourth terminal. The first terminal of the gain stage circuitry 520 is coupled to the first input terminal of the dropout loop circuitry 500, which supplies the input voltage. The second terminal of the gain stage circuitry 520 is coupled to the output terminal of the dropout loop circuitry 500, which supplies the error value. The third terminal of the gain stage circuitry 520 is coupled to the sense circuitry 515. The fourth terminal of the gain stage circuitry 520 is coupled to the common terminal, which supplies the common potential.

The current source circuitry 525 has a first terminal and a second terminal. The first terminal of the current source circuitry 525 is coupled to the input terminal of the dropout loop circuitry 500, which supplies the input voltage. The second terminal of the current source circuitry 525 is coupled to the sense circuitry 515, the resistor 530, and the capacitor 535. The resistor 530 has a first terminal and a second terminal. The first terminal of the resistor 530 is coupled to the sense circuitry 515, the current source circuitry 525, and the capacitor 535. The second terminal of the resistor 530 is coupled to the level shifter circuitry 510. The capacitor 535 has a first terminal and a second terminal. The first terminal of the capacitor 535 is coupled to the sense circuitry 515, the current source circuitry 525, and the resistor 530. The second terminal of the capacitor 535 is coupled to the common terminal, which supplies the common potential.

The transistor 540 has a first terminal, a second terminal, and a control terminal. The first and control terminals of the transistor 540 are coupled to the reference voltage source circuitry 505. The second terminal of the transistor 540 is coupled to the common terminal, which supplies the common potential. In the example of FIG. 5, the transistor 540 is structured as diode circuitry that, when forward biased, allows current to flow from the resistor 530 to the common potential.

The transistor 545 has a first terminal, a second terminal, and a control terminal. The first terminal of the transistor 545 is coupled to the gain stage circuitry 520. The second terminal of the transistor 545 is coupled to the input terminal of the dropout loop circuitry 500, which supplies the gate control voltage. The control terminal of the transistor 545 is coupled to the reference voltage source circuitry 505. The transistor 545 is another example of the transistor 348 of FIG. 3.

The transistor 550 has a first terminal, a second terminal, and a control terminal. The first terminal of the transistor 550 is coupled to the first input terminal of the dropout loop circuitry 500, which supplies the input voltage. The second and control terminals of the transistor 550 are coupled to the sense circuitry 515 and the transistor 555. The transistor 555 has a first terminal, a second terminal, and a control terminal. The first terminal of the transistor 555 is coupled to the first input terminal of the dropout loop circuitry 500, which supplies the input voltage. The second terminal of the transistor 555 is coupled to the transistors 560, 570, the current source circuitry 575, and the resistor 580. The control terminal of the transistor 555 is coupled to the sense circuitry 515 and the transistor 550. In the example of FIG. 5, the transistors 550, 555 are structured as current mirror circuitry, which mirrors the current through the transistor 545. Alternatively, the dropout loop circuitry 500 may be modified to remove or replace the transistors 550, 555 with alternative current mirror circuitry.

The transistor 560 has a first terminal, a second terminal, and a control terminal. The first terminal of the transistor 560 is coupled to the input terminal of the dropout loop circuitry 500, which supplies the input voltage. The second terminal of the transistor 560 is coupled to the transistor 565 and the output terminal of the dropout loop circuitry 500. The control terminal of the transistor 560 is coupled to the transistors 555, 570, the current source circuitry 575, and the resistor 580.

The transistor 565 has a first terminal, a second terminal, and a control terminal. The first terminal of the transistor 565 is coupled to the first input terminal of the dropout loop circuitry 500, which supplies the input voltage. The second terminal of the transistor 565 is coupled to the transistor 570. The control terminal of the transistor 565 is coupled to the transistor 560 and the output terminal of the dropout loop circuitry 500, which supplies the error value. The transistor 570 has a first terminal, a second terminal, and a control terminal. The first and control terminals of the transistor 570 are coupled to the transistor 565. The second terminal of the transistor 570 is coupled to the transistors 555, 560, the current source circuitry 575, and the resistor 580.

The current source circuitry 575 has a first terminal and a second terminal. The first terminal of the current source circuitry 575 is coupled to the transistors 555, 560, 570 and the resistor 580. The second terminal of the current source circuitry 575 is coupled to the common terminal, which supplies the common potential.

The resistor 580 has a first terminal and a second terminal. The first terminal of the resistor 580 is coupled to the transistors 555, 560, 570 and the current source circuitry 575. The second terminal of the resistor 580 is coupled to the capacitor 585. The capacitor 585 has a first terminal and a second terminal. The first terminal of the capacitor 585 is coupled to the resistor 580. The second terminal of the capacitor 585 is coupled to the common terminal, which supplies the common potential. In the example of FIG. 5, the resistor 580 and the capacitor 585 are structured as frequency compensation circuitry, which has a timing constant that stabilizes the loop formed between the dropout loop circuitry 500 and the LDO regulator circuitry 160, 204. Alternatively, the dropout loop circuitry 500 may be modified to remove or replace the resistor 580 and capacitor 585 with alternative circuitry to stabilize the dropout loop circuitry 500.

In the example of FIG. 5, the transistors 540, 545, 560, 565, 570 are n-channel MOSFETs. Alternatively, the transistors 540, 545, 560, 565, 570 may be n-channel FETs, n-channel IGBTs, n-channel JFETs, NPN BJTs, or, with slight modifications, p-type equivalent devices. In the example of FIG. 5, the transistors 550, 555 are p-channel MOSFETs. Alternatively, the transistors 550, 555 may be p-channel FETs, p-channel IGBTs, p-channel JFETs, PNP BJTs or, with slight modifications, n-type equivalent devices. The transistors 540, 545, 550, 555, 560, 565, 570 may be depletion mode devices, drain-extended devices, enhancement mode devices, natural transistors or other type of device structure transistors. Furthermore, the transistors 540, 545, 550, 555, 560, 565, 570 may be implemented in/over a silicon substrate (Si), a silicon carbide substrate (SiC), a gallium nitride substrate (GaN) or a gallium arsenide substrate (GaAs).

In the example of FIG. 5, the dropout loop circuitry 500 is structured to support relatively low input voltages in comparison to the dropout loop circuitry 300, 400. In such examples, the transistors 540, 545, 550, 555, 560, 565, 570 are low voltage transistors. In example operation, the reference voltage source circuitry 505 generates the dropout reference voltage to be approximately equal to the current from the current source circuitry 525 times a resistance of the resistor 530. The level shifter circuitry 510 shifts the reference dropout voltage by approximately the threshold voltage of the transistor 540. The sense circuitry 515 and the gain stage circuitry 520 operate similar to the sense circuitry 312 and the gain stage circuitry 316. Further example operations of the dropout loop circuitry 500 are illustrated and described in connection with FIG. 6, below.

Figure 6:
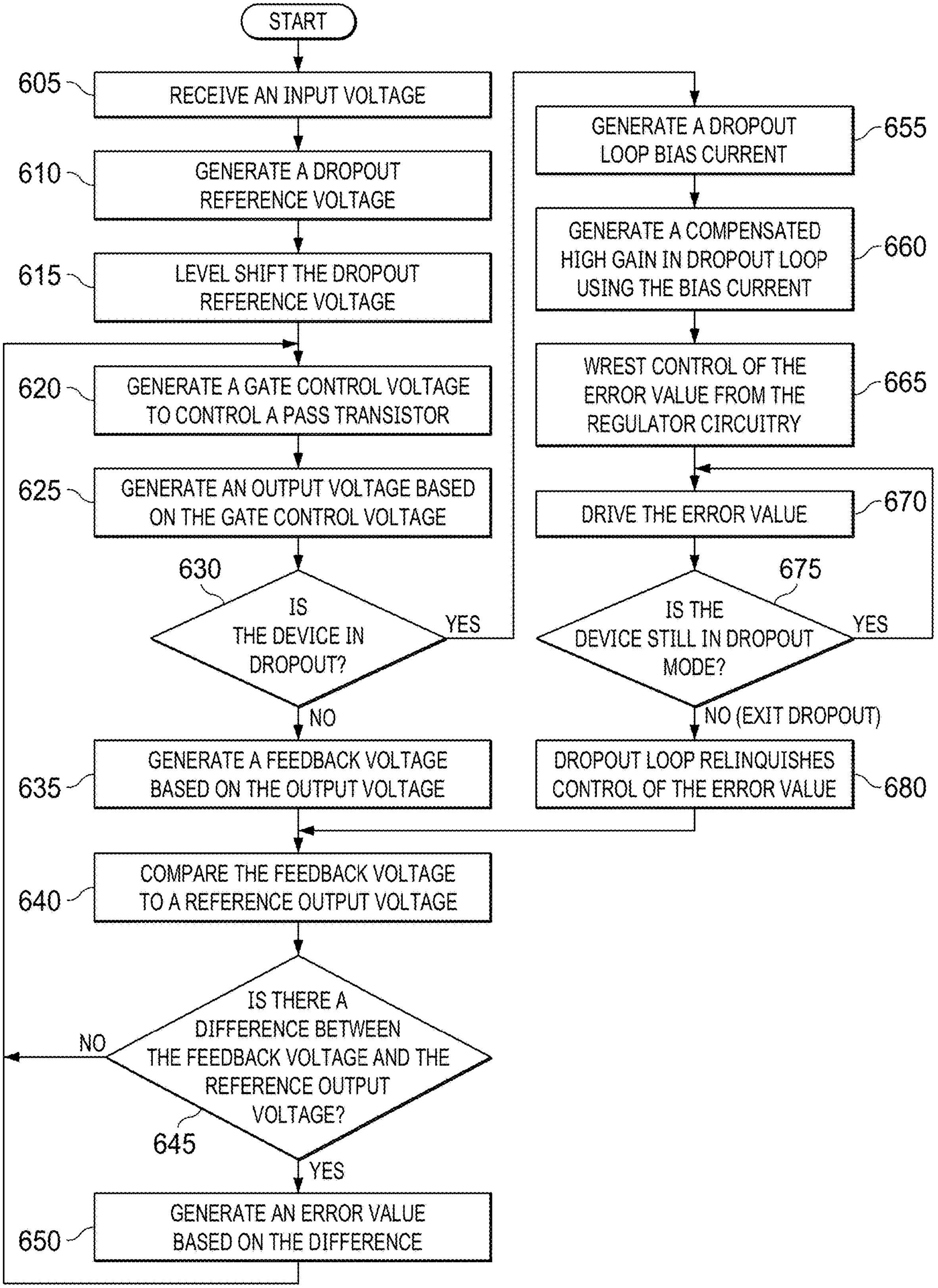
FIG. 6 is a flowchart representative of example operations that may be at least one of executed, instantiated, or performed using an example implementation of the dropout loop circuitry of FIGS. 1, 2, 3, 4, and 5 and the LDO regulator circuitry of FIGS. 1 and 2.

FIG. 6 is a flowchart representative of example operations 600 that may be at least one of executed, instantiated, or performed using an example implementation of the dropout loop circuitry 170, 208, 300, 400, 500 of FIGS. 1, 2, 3, 4, and 5 and the LDO regulator circuitry 160, 204 of FIGS. 1 and 2. The example operations 600 of FIG. 6 begin at Block 605 at which the dropout loop circuitry 170, 208, 300, 400, 500 and the LDO regulator circuitry 160, 204 receive an input voltage. (Block 605). In some examples, the voltage regulator system 100 of FIG. 1 receives an input voltage at an input terminal. In such examples, the input terminal of the voltage regulator system 100 is coupled to an external power source, such as a battery.

The reference voltage source circuitry 276, 304, 505 of FIGS. 2, 3, 4, and 5 generates a dropout reference voltage. (Block 610). The reference voltage source circuitry 276, 304, 505 generates a dropout reference voltage with respect to the input voltage to sense the pull-down of the gate control voltage during dropout conditions. For example, the dropout reference voltage is equal to the sum of the gate-to-source voltages of the transistors 322, 324, 326, 328, 330 of FIGS. 3 and 4, when biased by the current of the current source circuitry 318 of FIG. 3. In other examples, when the input voltage is limited to a relatively low voltage, the dropout reference voltage is equal to the resistance of the resistor 530 of FIG. 5 times a bias current from the current source circuitry 525 of FIG. 5. Alternatively, another type of reference generation may be used. For example, the transistors 322, 324, 326, 328, 330 may be replaced with a bandgap referenced resistor. In such examples, the bandgap referenced resistors, which have a higher accuracy, allows the dropout reference voltage to be maximized without exceeding the safe operating voltage of the transistor 220. Such a dropout reference voltage allows the dropout loop circuitry 170, 208, 300, 400, 500 to control the transistor 220 with larger gate-to-source voltages, which supports lower dropout voltages.

Advantageously, the dropout reference voltage is a threshold gate-to-source voltage of the transistor 220 that corresponds to dropout operations. Advantageously, the dropout loop circuitry 170, 208, 300, 400, 500 can determine that the LDO regulator circuitry 160, 204 is in dropout operations when the gate control voltage approaches the dropout reference voltage.

The level shifter circuitry 280, 308, 410, 510 of FIGS. 2, 3, 4, and 5 level shifts the dropout reference voltage. (Block 615). In some examples, the level shifter circuitry 280, 308, 510 shifts the reference dropout voltage by the gate-to-source voltage of the transistors 332, 540 of FIGS. 3 and 5. In other examples, the level shifter circuitry 410 shifts the reference dropout voltage by a voltage difference across the resistor 430 plus the gate-to-source voltage of the transistor 420 of FIG. 4. In such examples, the voltage difference across the resistor 430 is equal to the resistance of the resistor 430 times the current from the current source circuitry 440.

The resistors 252, 260 of FIG. 2 and the transistor 256 of FIG. 2 generate a gate control voltage to control a pass transistor. (Block 620). In some examples, the resistors 252, 260 generate a voltage difference across the transistor 256 responsive to receiving the input voltage. In such examples, the voltage difference turns on the transistor 256, which controls a supply of current to the resistor 252 and sets the gate control voltage of the transistor 220 of FIG. 2.

The transistor 220 generates an output voltage based on the gate control voltage. (Block 625). In some examples, the transistor 220 begins to conduct current (e.g., turns on responsive to the gate control voltage from the resistors 252, 260 and the transistor 256. In such examples, the resistors 140, 150, 212, 216 of FIGS. 2 set the output voltage responsive to the current from the transistor 220.

The sense circuitry 284, 312, 515 determines if the device is in dropout. (Block 630). In dropout conditions, the input voltage of the voltage regulator system 100 is less than the desired output voltage, which limits the maximum output voltage to the input voltage. In such conditions, the error amplifier circuitry 228 attempts to generate an error value approximately equal to the common potential. When the error value is equal to the common potential, the buffer circuitry 248 drives the gate control voltage towards the common potential. However, in the examples described herein, the sense circuitry 284, 312, 515 use the shifted dropout reference voltage from the level shifter circuitry 280, 308, 510 to control the transistors 348, 545 of FIGS. 3, 4, and 5. In such examples, the sense circuitry 284, 312, 515 determines the LDO regulator circuitry 160, 204 is in dropout operations responsive to the gate control voltage of the transistor 220 being a threshold voltage less than the shifted dropout reference voltage. In example operations, the transistors 348, 545 begin to conduct current responsive to the gate control voltage being pulled a threshold voltage less than the shifted dropout reference voltage.

In some examples, components of the level shifter circuitry 280, 308, 410, 510 are sized in relation to the transistors 348, 545 to cause the sense circuitry 284, 312, 515 to conduct current at voltages above the common potential. For example, the transistor 332 is sized to have a gate-to-source voltage that is approximately three-hundred millivolts (mV) greater than the transistor 348, during conduction. In such an example, the transistor 332 ensures that the transistor 348 begins to conduct current when the gate control voltage is approximately three-hundred millivolts. Advantageously, limiting the gate control voltage to a voltage above the common potential keeps the transistor 268 in a state of conduction, which decreases a response time to transient input voltages.

In another example, the resistor 430 and the current source circuitry 440 are sized to shift the reference dropout voltage by approximately three-hundred millivolts. In such examples, the resistor 430 and the current source circuitry 440 ensure that the transistor 348 begins to conduct current when the gate control voltage is approximately three-hundred millivolts. Advantageously, limiting the gate control voltage to a voltage above the common potential keeps the transistor 268 in a state of conduction, which decreases a response time to transient input voltages.

In yet another example, the transistor 540 is sized to have a gate-to-source voltage that is approximately equal to the transistor 545, during conduction. In such an example, the transistor 540 ensures that the transistor 545 begins to conduct current when the gate control voltage is approximately equal to the voltage difference across the resistor 530. Advantageously, the transistor 540 level shifts the reference dropout voltage to cause the transistor 545 to conduct at the voltage set by the current source circuitry 525 and the resistor 530.

If the sense circuitry 284, 312, 515 determines that the device is not in dropout (e.g., Block 630 returns a result of NO), the resistors 140, 150, 212, 216 generate a feedback voltage based on the output voltage. (Block 635). In some examples, the resistors 140, 150, 212, 216 generate a feedback voltage by dividing the output voltage across the resistances of the resistors 140, 150, 212, 216. In such examples, the feedback voltage is a scaled representation of the output voltage.

The error amplifier circuitry 228 of FIG. 2 compares the feedback voltage to a reference output voltage. (Block 640). In some examples, the error amplifier circuitry 228 compares the feedback voltage from the resistors 140, 150, 212, 216 to a reference feedback voltage. The reference feedback voltage represents a target feedback voltage that is produced by the resistors 140, 150, 212, 216 when the output voltage is a desired value. For example, when the resistors 140, 150, 212, 216 are structured to generate a feedback voltage that is approximately one-half of the output voltage and the desired output voltage is twelve volts (V), the reference feedback voltage is six volts. In such examples, the error amplifier circuitry 228 compares the feedback voltage from the resistors 140, 150, 212, 216 to six volts.

The error amplifier circuitry 228 determines if there is a difference between the feedback voltage and the reference output voltage. (Block 645). In some examples, the error amplifier circuitry 228 compares the reference feedback voltage to the feedback voltage from the resistors 140, 150,

212, 216 to determine if the transistor 220 is generating the desired output voltage. If the feedback voltage is different than the reference feedback voltage, the error amplifier circuitry 228 determines that the gate control voltage needs to be adjusted.

If the error amplifier circuitry 228 determines that there is no difference between the feedback voltage and the reference output voltage (e.g., Block 645 returns a result of NO), control proceeds to return to Block 620. In some examples, the error amplifier circuitry 228 determines that the transistor 220 is accurately generating the desired output voltage responsive to the feedback voltage matching the reference feedback voltage.

If the error amplifier circuitry 228 determines that there is a difference between the feedback voltage and the reference output voltage (e.g., Block 645 returns a result of YES), the error amplifier circuitry 228 generates an error value based on the difference. (Block 650). In some examples, the error amplifier circuitry 228 determines that the transistor 220 is generating an undesired output voltage responsive to a mismatch between the feedback voltage and the reference feedback voltage. In such examples, the error amplifier circuitry 228 generates an error value that is proportional to the difference between the feedback voltage and the reference feedback voltage. The buffer circuitry 248 controls the transistor 268 of FIG. 2 based on the error value from the error amplifier circuitry 228. Advantageously, adjusting the current through the transistor 268 modifies the current through the resistors 252, 260, which modifies the gate control voltage of the transistor 220.

If the sense circuitry 284, 312, 515 determines that the device is in dropout (e.g., Block 630 returns a result of YES), the sense circuitry 284, 312, 515 turns on a dropout loop bias current. (Block 655). In some examples, when the difference between the shifted dropout reference voltage and the gate control voltage is greater than or equal to the threshold voltage of the transistors 348, 545, the transistors 348, 545 conduct a bias current through the transistors 352, 550 of FIGS. 3, 4, and 5. In such examples, the gain stage circuitry 288, 316, 520 of FIGS. 2, 3, 4, and 5 supplies the bias current responsive to the transistors 348, 545 of the sense circuitry 284, 312, 515 conducting current.

The gain stage circuitry 288, 316, 520 generates a compensated high gain in dropout loop using the bias current. (Block 660). In some examples, the transistors 356, 364, 366, 368, 372, 376, 555, 560 of FIGS. 3, 4, and 5 mirror and amplify the bias current through the transistors 348, 545. For example, the transistor 356 mirrors the bias current through the transistor 352, the transistors 364, 366 mirror the current through the transistor 356, and the transistors 368, 372 mirror the current through the transistor 366. In such examples, the transistors 356, 366, 372 are sized to mirror the current and have a relatively high voltage gain. In another example, the transistor 555 mirrors the current through the transistor 550. Advantageously, the transistors 356, 364, 366, 368, 372, 376, 555, 560 have a relatively large voltage gain during dropout conditions.

The gain stage circuitry 288 316, 520 wrests control of the error value from the LDO regulator circuitry 160, 204. (Block 665). In some examples, the transistors 372, 555 generate a drive voltage responsive to the bias current. The drive voltage is proportional to voltages of the bias current times the gain of the transistors 356, 364, 366, 368, 372, 376, 555, 560. In such examples, the transistors 372, 555 use the drive voltage to control the transistors 376, 560, which assume control of the error value responsive to the drive voltage. Advantageously, the high voltage gain and strong low resistance drive of the error value by the transistors 376, 560 prevents the error amplifier circuitry 228 from saturating the error value to the common potential. Advantageously, using the transistor 376, 560 as a low resistance current path to drive the error value ensures that the dropout loop circuitry 170, 208, 300, 400, 500 supplies enough current to prevent the error amplifier circuitry 228 from setting the error value to the common potential.

The gain stage circuitry 288 316, 520 drives the error value despite a changing input voltage and output load. (Block 670). In some examples, the transistors 376, 560 supply the amplified compensation drive to the LDO regulator circuitry 160, 204. In such examples, the amplified compensation drive prevents the error amplifier circuitry 228 from setting the input of the buffer circuitry 248. Advantageously, the compensation by the transistors 376, 560 prevents the LDO regulator circuitry 160, 204 from fully enabling the transistor 268. Advantageously, holding the transistor 268 in a state of conduction allows the transistor 268 to quickly compensate the gate control voltage for transients of the input voltage. Advantageously, the dropout loop circuitry 170, 208, 300, 400, 500 keeps the LDO regulator circuitry 160, 204 in a state of regulation during dropout conditions. Advantageously, when in the state of regulation, the LDO regulator circuitry 160, 204 is capable of responding to transients of the input voltage without waiting for the error amplifier circuitry 228 to set the error value. Advantageously, the amplified compensation current prevents the LDO regulator circuitry 160, 204 from fully enabling the transistor 268. Advantageously, holding the transistor 268 in a state of conduction allows the transistor 268 to quickly compensate the gate control voltage for transients of the input voltage. Advantageously, the dropout loop circuitry 170, 208, 300, 400, 500 keeps the LDO regulator circuitry 160, 204 in a state of regulation during dropout conditions. Advantageously, when in the state of regulation, the LDO regulator circuitry 160, 204 is capable of responding to transients of the input voltage without waiting for the error amplifier circuitry 228 to set the error value.

The sense circuitry 284, 312, 515 determines if the device is still in dropout. (Block 675). Similar to the operations of Block 630, the transistors 348, 545 of the sense circuitry 284, 312, 515 conduct current responsive to the gate control voltage being less than the dropout reference voltage. In such examples, the transistors 348, 545 continue to conduct current when in dropout. If the sense circuitry 284, 312, 515 determines that the device is still in dropout (Block 675 returns a result of YES), control proceeds to return to Block 670.

If the sense circuitry 284, 312, 515 determines that the device is not still in dropout (Block 675 returns a result of NO), the dropout loop circuitry 170, 208, 300, 400, 500 relinquishes control of the error value. (Block 680). In some examples, the transistors 348, 545 of the sense circuitry 284, 312, 515 no longer conduct the bias current responsive to dropout conditions no longer being met. In such examples, the gain stage circuitry 288, 316, 520 no longer mirrors and amplifies the bias current, which prevents the transistors 372, 555 from generating the drive voltage to control the transistors 376, 560. The dropout loop circuitry 170, 208, 300, 400, 500 allows the error amplifier circuitry 228 to control the error value during normal operations. Control proceeds to return to Block 620.

Although example methods are described with reference to the flowchart illustrated in FIG. 6, many other methods of implementing the dropout loop circuitry 170, 208, 300, 400,

500 of FIGS. 1, 2, 3, 4, and 5 and the LDO regulator circuitry 160, 204 of FIGS. 1 and 2 may also be used in this description. For example, the order of execution of the blocks may be changed, or some of the blocks described may be changed, eliminated, or combined. Similarly, additional operations may be included in the manufacturing process before, in between, or after the blocks shown in the illustrated examples.

Figure 7:
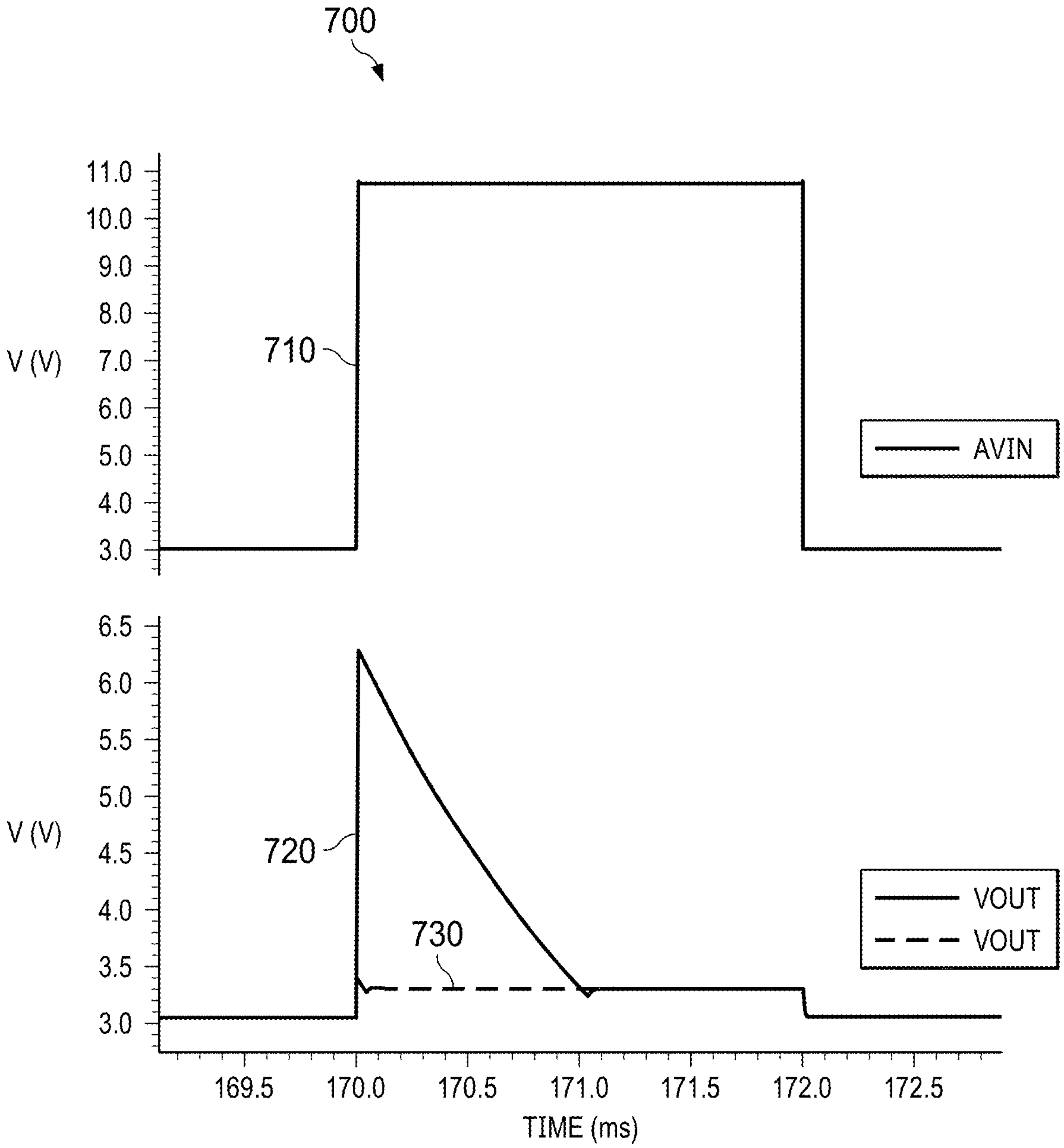
FIG. 7 is a timing diagram of example operations of the dropout loop circuitry of FIGS. 1, 2, 3, 4, and 5 and the LDO regulator circuitry of FIGS. 1 and 2 when exiting a dropout condition.

FIG. 7 is a timing diagram 700 of example operations of the dropout loop circuitry 170, 208, 300, 400, 500 of FIGS. 1, 2, 3, 4, and 5 and the LDO regulator circuitry 160, 204 of FIGS. 1 and 2 when exiting a dropout condition. In the example of FIG. 7, the timing diagram 700 includes an example input voltage signal 710, an example unregulated output voltage signal 720, and an example regulated output voltage signal 730. The input voltage signal 710 illustrates the input voltage of the linear regulator circuitry 120, 200 of FIGS. 1 and 2 over time. The unregulated output voltage signal 720 illustrates an output voltage of the linear regulator circuitry 120, 200 without the dropout loop circuitry 170, 208, 300, 400, 500 over time. The regulated output voltage signal 730 illustrates an output voltage of the linear regulator circuitry 120, 200 with the dropout loop circuitry 170, 208, 300, 400, 500 over time.

The input voltage signal 710 begins at a voltage that causes the linear regulator circuitry 120, 200 to be in dropout operations. When the input voltage signal 710 suddenly increases, the unregulated output voltage signal 720 spikes. The unregulated output voltage signal 720 begins to settle as the error amplifier circuitry 228 of FIG. 2 adjusts the error value. Such an overshoot of the output voltage may damage downstream circuitry. When the input voltage signal 710 suddenly increases, the regulated output voltage signal 730 returns to a regulated output voltage with very small overshoot. The regulated output voltage signal 730 settles shortly after the sudden increase in the input voltage signal 710.

Figure 8:
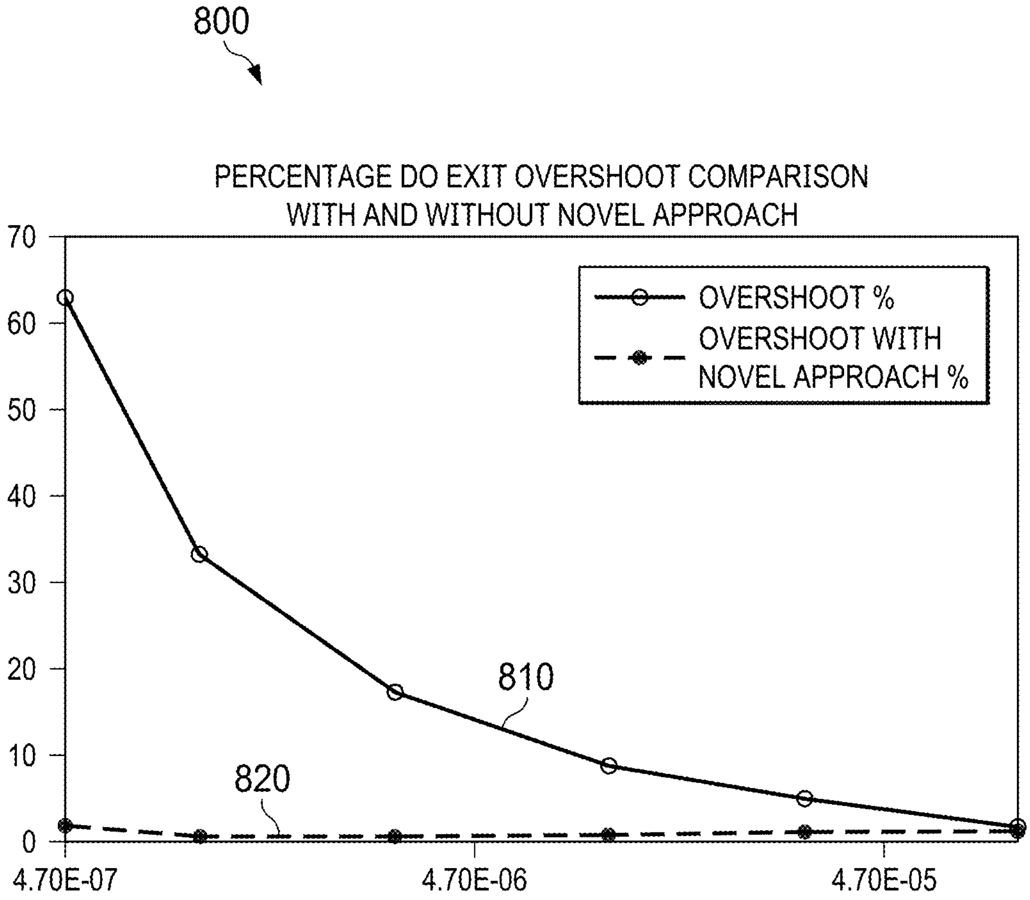
FIG. 8 is a timing diagram of example overshoot of the dropout loop circuitry of FIGS. 1, 2, 3, 4, and 5 and the LDO regulator circuitry of FIGS. 1 and 2 when exiting a dropout condition.

FIG. 8 is a timing diagram 800 of example operations of the overshoot of the dropout loop circuitry 170, 208, 300, 400, 500 of FIGS. 1, 2, 3, 4, and 5 and the LDO regulator circuitry 160, 204 of FIGS. 1 and 2 when exiting a dropout condition. In the example of FIG. 8, the timing diagram 800 includes an example unregulated overshoot signal 810 and an example regulated overshoot signal 820. The unregulated overshoot signal 810 illustrates an overshoot of the output voltage in response to the linear regulator circuitry 120, 200 of FIGS. 1 and 2 exiting dropout conditions without the dropout loop circuitry 170, 208, 300, 400, 500. The regulated overshoot signal 820 illustrates an overshoot of the output voltage in response to the linear regulator circuitry 120, 200 of FIGS. 1 and 2 exiting dropout conditions with the dropout loop circuitry 170, 208, 300, 400, 500. Advantageously, the dropout loop circuitry 170, 208, 300, 400, 500 decreases the overshoot voltage at the output of the linear regulator circuitry 120, 200 when exiting dropout conditions.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and things, the phrase "at least one of A and B" refers to implementations including any of (1) at least one A, (2) at least one B, or (3) at least one A and at least one B. Similarly, as used herein in the context of describing structures, components, items, objects and things, the phrase "at least one of A or B" refers to implementations including any of (1) at least one A, (2) at least one B, or (3) at least one A and at least one B. As used herein in the context of describing the performance or execution of processes, instructions, actions, activities, etc., the phrase "at least one of A and B" refers to implementations including any of (1) at least one A, (2) at least one B, or (3) at least one A and at least one B. Similarly, as used herein in the context of describing the performance or execution of processes, instructions, actions, activities, etc., the phrase "at least one of A or B" refers to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or actions may be implemented by, e.g., the same entity or object. Also, although individual features may be included in different examples or claims, these may possibly be combined, and the inclusion in different examples or claims does not imply that a combination of features is at least one of not feasible or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by at least one of the connection reference or relative movement between those elements unless otherwise indicated. As such, connection references do not necessarily infer that two elements are directly connected or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, or ordering in any way, but are merely used as at least one of labels or arbitrary names to distinguish elements for ease of understanding the described examples. In some examples, the descriptor "first" may be used to refer to an element in the detailed description, while the same element may be referred to in a claim with a different descriptor such as "second" or "third." In such instances, such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to at least one of manufacturing tolerances or other real-world imperfections. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses one of or a combination of direct communication or indirect communication through one or more intermediary components, and does not require direct physical (e.g., wired) communication or constant communication, but rather also includes selective communication at least one of periodic intervals, scheduled intervals, aperiodic intervals, or one-time events.

As used herein, "programmable circuitry" is defined to include at least one of (i) one or more special purpose electrical circuits (e.g., an application specific circuit (ASIC)) structured to perform specific operation(s) and including one or more semiconductor-based logic devices (e.g., electrical hardware implemented by one or more transistors), or (ii) one or more general purpose semiconductor-based electrical circuits programmable with instructions to perform one or more specific functions(s) or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations or functions, Field Programmable Gate Arrays (FPGAs) that may be programmed with second instructions to at least one of configure or structure the FPGAs to instantiate one or more operations or functions corresponding to the first instructions, Graphics Processor Units (GPUs) that may execute first instructions to perform one or more operations or functions, Digital Signal Processors (DSPs) that may execute first instructions to perform one or more operations or functions, XPUs, Network Processing Units (NPUs) one or more microcontrollers that may execute first instructions to perform one or more operations or functions or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., at least one of programmed or hardwired) at a time of manufacturing by a manufacturer to at least one of perform the function or be configurable (or re-configurable) by a user after manufacturing to perform the function/or other additional or alternative functions. The configuring may be through at least one of firmware or software programming of the device, through at least one of a construction or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

In the description and claims, described "circuitry" may include one or more circuits. A circuit or device that is described herein as including certain components may instead be adapted to be coupled to those components to form the described circuitry or device. For example, a structure described as including one or more semiconductor elements (such as transistors), one or more passive elements (such as one of or a combination of resistors, capacitors, or inductors), or one or more sources (such as voltage and/or current sources) may instead include only the semiconductor elements within a single physical device (e.g., at least one of a semiconductor die or integrated circuit (IC) package) and may be adapted to be coupled to at least some of the passive elements or the sources to form the described structure either at a time of manufacture or after a time of manufacture, for example, by at least one of an end-user or a third-party.

Circuits described herein are reconfigurable to include the replaced components to provide functionality at least partially similar to functionality available prior to the component replacement. Components shown as resistors, unless otherwise stated, are generally representative of any one or more elements coupled in at least one of series or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor. While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and some features illustrated as being internal to the integrated circuit may be incorporated outside of the integrated. As used herein, the term "integrated circuit" means one or more circuits that are at least one of: (i) incorporated in/over a semiconductor substrate; (ii) incorporated in a single semiconductor package; (iii) incorporated into the same module; or (iv) incorporated in/on the same printed circuit board.

Uses of the phrase "ground" in the foregoing description include at least one of a chassis ground, an Earth ground, a floating ground, a virtual ground, a digital ground, a common ground, or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero.

Modifications are possible in the described embodiments, and other embodiments are possible, within the scope of the claims.

What is claimed is:

1. A circuit comprising:

a pass transistor having a control terminal, the pass transistor coupled between an input voltage terminal and an output voltage terminal buffer circuitry having an error input and a control output, the control output coupled to the control terminal of the pass transistor;

error amplifier circuitry having a reference input, a feedback input, and an error output, the feedback input coupled to the output voltage terminal, the error output coupled to the error input;

reference voltage source circuitry coupled to the input voltage terminal and having a reference output;

a sense transistor having first and second terminals and a control terminal, the control terminal coupled to the reference output of the reference voltage source circuitry, the first terminal coupled to the control terminal of the pass transistor; and a third transistor having first and second terminals and a control terminal, the first terminal coupled to a supply voltage terminal, the second terminal coupled to the error input and the error output, the control terminal coupled to the second terminal of the sense transistor.

2. The circuit of claim 1, further comprising:

current mirror circuitry coupled between the control terminal of the third transistor and the second terminal of the sense transistor.

3. The circuit of claim 1, wherein the buffer circuitry includes:

an inverter having an input coupled to the error output of the error amplifier circuitry, and having an output; and a fourth transistor having a control terminal coupled to the output of the inverter and a terminal coupled to the control terminal of the pass transistor.

4. The circuit of claim 1, further comprising level shifter circuitry coupled to the reference output of the reference voltage source circuitry.

5. The circuit of claim 2, wherein the current mirror circuitry includes:

a fourth transistor having a first terminal coupled to the input voltage terminal, and a second terminal and a control terminal coupled to the second terminal of the sense transistor;

a fifth transistor having first and second terminals and a control terminal, the first terminal coupled to the input voltage terminal, the control terminal coupled to the second terminal of the sense transistor, the second terminal of the fourth transistor, and the control terminal of the fourth transistor;

a sixth transistor having a terminal and a control terminal coupled to the second terminal of the fifth transistor;

a seventh transistor having a terminal and a control terminal, the control terminal coupled to the second terminal of the fifth transistor, the terminal of the sixth transistor, and the control terminal of the sixth transistor;

an eighth transistor having a first terminal coupled to the supply voltage terminal and second terminal and a control terminal coupled to the terminal of the seventh transistor; and a ninth transistor having a first terminal coupled to the supply voltage terminal, a second terminal coupled to the control terminal of the third transistor, and a control terminal coupled to the terminal of the seventh transistor, the second terminal of the eighth transistor, and the control terminal of the eighth transistor.

6. The circuit of claim 5, further comprising a tenth transistor having a first terminal coupled to the second terminal of the fifth transistor and a second terminal coupled to the terminal and the control terminal of the sixth transistor, and wherein the tenth transistor is a drain extended transistor.

7. The circuit of claim 2, further comprising:

a fourth transistor having first and second terminals and a control terminal, the first terminal coupled to the supply voltage terminal, the control terminal coupled to the second terminal of the third transistor;

a fifth transistor having first and second terminals and a control terminal, the first terminal of the fifth transistor coupled to the second terminal of the fourth transistor and to the control terminal of the fifth transistor; and current source circuitry having a terminal coupled to a terminal of the current mirror circuitry, the control terminal of the third transistor, and the second terminal of the fifth transistor.

8. An apparatus comprising:

a transistor having a control terminal, the transistor coupled between an input voltage terminal and an output voltage terminal;

error amplifier circuitry having an input coupled to the output voltage terminal and an output coupled to the control terminal of the transistor, the error amplifier circuitry configurable to generate an error signal to control a gate voltage of the transistor responsive to an output voltage at the output voltage terminal and to a first reference voltage; and loop circuitry having a current input coupled to the control terminal of the transistor and a current output coupled to the output of the error amplifier circuitry, the loop circuitry configurable to receive a first current representative of the gate voltage of the transistor, and provide a second current representative of an error signal adjustment based on the gate voltage being less than a second reference voltage.

9. The apparatus of claim 8, wherein the apparatus is linear regulator circuitry.

10. The apparatus of claim 8, wherein the transistor is a first transistor, and the loop circuitry includes:

a second transistor having first and second terminals and a control terminal, the first terminal coupled to the control terminal of the first transistor, the second transistor configurable to receive the first current representative of the gate voltage of the first transistor;

a third transistor having a terminal coupled to an error output of the error amplifier circuitry and a control terminal coupled to the second terminal of the second transistor, the third transistor configurable to provide the second current representative of the error signal adjustment; and reference voltage source circuitry having an input coupled to the input voltage terminal and an output coupled to the control terminal of the second transistor, the reference voltage source circuitry configurable to generate a signal representative of the second reference voltage.

11. The apparatus of claim 10, wherein the loop circuitry further includes level shifter circuitry coupled to the output of the reference voltage source circuitry, the level shifter circuitry configurable to generate the second reference voltage responsive to the signal from the reference voltage source circuitry.

12. The apparatus of claim 8, further comprising:

buffer circuitry coupled between the output of the error amplifier circuitry and the control terminal of the transistor.

13. The apparatus of claim 10, wherein the loop circuitry further includes current mirror circuitry coupled between the second terminal of the second transistor and the control terminal of the third transistor.

14. The apparatus of claim 12, wherein the transistor is a first transistor, and the buffer circuitry includes:

a second transistor having a control terminal coupled to the output of the error amplifier circuitry and a terminal coupled to the control terminal of the first transistor, the second transistor configurable to control the gate voltage of the first transistor responsive to the error signal adjustment.

15. An apparatus comprising:

a transistor having a control terminal, the transistor coupled between an input voltage terminal and an output voltage terminal and configurable to generate an output signal based on an input signal;

error loop circuitry coupled between the output voltage terminal and the control terminal of the transistor and having an input, the error loop circuitry configurable to generate an error signal to control a gate signal to the transistor responsive to a feedback signal representative of the output signal and to a first reference signal; and dropout loop circuitry having a first input coupled to the input voltage terminal, a second input coupled to the control terminal of the transistor, and an output coupled to the input of the error loop circuitry, the dropout loop circuitry configurable to generate a second reference signal based on the input signal, detect a dropout condition based on an input signal representative of the gate signal and the second reference signal, and generate an error signal adjustment responsive to the detected dropout condition.

16. The apparatus of claim 15, wherein the dropout loop circuitry is further configurable to:

monitor the input signal representative of the gate signal;

detect an exit of the dropout condition based on the input signal representative of the gate signal and the second reference signal; and discontinue generating the error signal adjustment responsive to the detected exit of the dropout condition.

17. The apparatus of claim 15, wherein the second reference signal is a dropout reference signal, the dropout loop circuitry is further configurable to:

generate a third reference signal corresponding to the dropout conditions; and generate the dropout reference signal by level shifting the third reference signal.

18. The apparatus of claim 15, wherein the error loop circuitry includes:

error amplifier circuitry coupled to the output voltage terminal and configurable to generate the error signal; and buffer circuitry coupled between the error amplifier circuitry and the control terminal of the transistor and configurable to receive the error signal and the error signal adjustment and adjust the gate signal responsive to the detected dropout condition.

19. The apparatus of claim 15, wherein the dropout loop circuitry is further configurable to:

detect the dropout condition by generating a current responsive to the input signal representative of the gate signal and the second reference signal; and generate the error signal adjustment based on the current.

20. The apparatus of claim 19, wherein the current is a first current, the error signal adjustment is a second current, and the dropout loop circuitry is further configurable to:

mirror the first current; and generate the second current proportional to the first current.

* * * * *